US010225839B2

(12) United States Patent
Watts

(10) Patent No.: US 10,225,839 B2
(45) Date of Patent: Mar. 5, 2019

(54) TIERED DEVELOPER UNLOCK OF NETWORK HUB WITH SOFTWARE DEFINED RADIO PROTECTION

(71) Applicant: T-Mobile USA, Inc., Bellevue, WA (US)

(72) Inventor: Andrew Lee Watts, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 56 days.

(21) Appl. No.: 15/660,815

(22) Filed: Jul. 26, 2017

(65) Prior Publication Data
US 2018/0324188 A1 Nov. 8, 2018

Related U.S. Application Data

(60) Provisional application No. 62/503,224, filed on May 8, 2017.

(51) Int. Cl.
G06F 7/04 (2006.01)
H04W 72/04 (2009.01)
H04L 12/24 (2006.01)
H04W 4/02 (2018.01)
G06F 8/65 (2018.01)
(Continued)

(52) U.S. Cl.
CPC .......... H04W 72/0453 (2013.01); G06F 8/65 (2013.01); G06F 9/4416 (2013.01); H04L 41/0813 (2013.01); H04L 41/0823 (2013.01); H04L 63/0245 (2013.01); H04L 63/0823 (2013.01); H04L 63/10 (2013.01); H04L 63/105 (2013.01); H04W 4/02 (2013.01); H04W 12/08 (2013.01);
(Continued)

(58) Field of Classification Search
CPC ... H04W 72/0453; H04W 12/08; H04W 4/02; H04W 72/085; H04W 72/082; G06F 9/4416; G06F 8/65; H04L 63/0245; H04L 63/10; H04L 63/0823; H04L 63/105; H04L 41/0813; H04L 41/0823; H04L 65/1016
USPC .......................................................... 726/4
See application file for complete search history.

(56) References Cited

U.S. PATENT DOCUMENTS

2002/0186121 A1 12/2002 Yoshikawa et al.
2009/0098852 A1 4/2009 Feher
(Continued)

OTHER PUBLICATIONS

The PCT Search Report and Written Opinion dated Jul. 27, 2018, for PCT Application No. PCT/US18/27958, 15 pages.
(Continued)

Primary Examiner — Mohammad W Reza
(74) Attorney, Agent, or Firm — Lee & Hayes, P.C.

(57) ABSTRACT

A network hub may be unlockable into a development environment at various levels of access to implement tiered unlocking. A network hub may send a request to a server computer for a device-specific certificate that is usable to unlock the network hub, the request including (i) a requested level of access, and (ii) a device identifier (ID) associated with the network hub. The network hub may receive the certificate from the server computer, reboot, determine whether the certificate is associated with a trusted entity, and, if so, unlock the network hub at the requested level of access as an unlocked network hub. The unlocked network hub allows for particular development activities (e.g., flashing custom software), but depending on the requested level of access, may or may not allow a user to change settings of a configurable software defined radio (SDR) of the network hub and/or flash custom firmware.

20 Claims, 7 Drawing Sheets

(51) Int. Cl.
    *G06F 9/4401* (2018.01)
    *H04L 29/06* (2006.01)
    *H04W 12/08* (2009.01)
    *H04W 72/08* (2009.01)

(52) U.S. Cl.
    CPC ....... *H04L 65/1016* (2013.01); *H04W 72/082* (2013.01); *H04W 72/085* (2013.01)

(56) References Cited

U.S. PATENT DOCUMENTS

| | | |
|---|---|---|
| 2010/0330919 A1 | 12/2010 | Gurney et al. |
| 2011/0090853 A1 | 4/2011 | Chandramouli et al. |
| 2012/0317224 A1 | 12/2012 | Caldwell et al. |
| 2013/0148596 A1 | 6/2013 | Shin et al. |
| 2013/0295946 A1 | 11/2013 | Panchal et al. |
| 2014/0096178 A1 | 4/2014 | Shippy et al. |
| 2014/0325210 A1 | 10/2014 | McCanna et al. |
| 2016/0100309 A1 | 4/2016 | Velusamy |
| 2017/0164417 A1 | 6/2017 | Kress et al. |
| 2017/0201895 A1 | 7/2017 | Hassan et al. |
| 2018/0324042 A1 | 11/2018 | Watts |
| 2018/0324148 A1 | 11/2018 | Watts |
| 2018/0324802 A1 | 11/2018 | Watts |

OTHER PUBLICATIONS

Office Action for U.S. Appl. No. 15/660,866, dated Oct. 19, 2018, Watts, "Dynamic Frequency Selection for Network Hub With Software Defined Radio", 11 pages.

Office Action for U.S. Appl. No. 15/660,847, dated Nov. 2, 2018, Watts, "Field Programmable Network Hub With Software Defined Radio", 11 pages.

TIERED DEVELOPER UNLOCK OF NETWORK HUB WITH SOFTWARE DEFINED RADIO PROTECTION

CROSS REFERENCE TO RELATED APPLICATIONS

This U.S. patent application claims priority to provisional U.S. patent application No. 62/503,224, entitled "T-HUB ARCHITECTURE AND METHODS OF USE," and filed on May 8, 2017, the entirety of which is incorporated herein by reference.

BACKGROUND

Networking technology remains at the core of enabling the exchange of data between connected devices, which are becoming more prevalent every day. Many of today's connected devices employ radio technologies that allow for mobile devices to exchange data wirelessly. Internet of Things (IoT) service providers, wireless carriers, and other such service providing entities, all rely on networking technologies to make their systems function.

Despite some recent innovations, existing technology has its limitations. For example, subscribers of telephony services still experience poor radio coverage in particular (e.g., geographically remote, indoor, etc.) locations. As another example, IoT technology can be somewhat cumbersome for users in terms of accessing IoT services from remote locations.

Furthermore, radio technologies are constantly evolving, which creates further challenges. For example, with regards to cellular-based radio technologies, fourth generation (4G) Long Term Evolution (LTE) is evolving to fifth generation (5G), much like 4G evolved from its predecessor third generation (3G), and second generation (2G) radio technologies. Typically, when a new radio technology emerges, fielded units cannot be easily repurposed to support the new radio technology. Instead, a complete redesign is often required in terms of both hardware and software in order to manufacture communication devices that are compatible with a new radio technology. In addition, when a new radio technology emerges, device manufacturers typically must wait for a standard that defines the new radio technology to be ratified before designing, testing, and manufacturing a new hardware radio platform and a corresponding software build. This often results in a significant time lag between the ratification of a standard and products with the latest radio technology hitting the market. Some device manufacturers even take extra measures to stay competitive, such as beginning early development on device hardware while standards meetings are taking place. These companies risk losing a significant investment by developing hardware platforms well in advance of a standard's ratification, not knowing for sure if a standard will end up how they think it will.

Another drawback of existing technology is that bootloaders of connected devices often come either fully locked or fully unlocked (or unlockable). A fully locked bootloader prevents a developer from using the device as a developer device (e.g., flashing of custom firmware and/or software on the device). This is undesirable in view of today's technology development ecosystem, which includes a large developer community that innovates by developing new technologies (e.g., flashing custom software and/or custom firmware) for off-the-shelf communication devices, oftentimes in cooperation with a wireless carrier and/or device manufacturer. On the other hand, a fully unlocked (or unlockable) bootloader is undesirable because end users (including developers) are given unfettered access to any and all secure areas of the device, and a device manufacturer and/or carrier may want to restrict some areas from developer access in order to maintain proper (e.g., lawful) functionality of the device.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Figure 1:
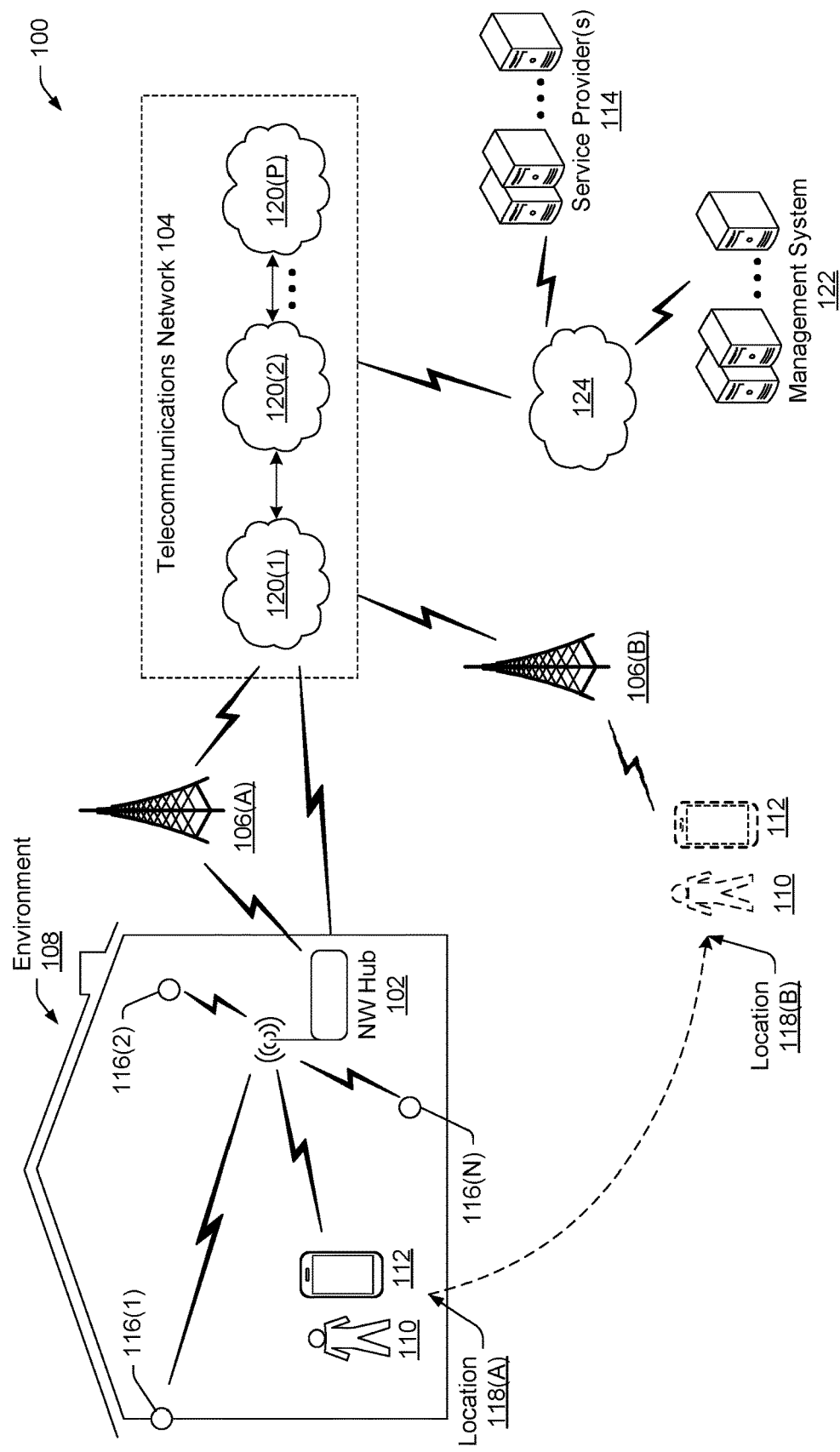
FIG. 1 illustrates an example network environment in which a network hub, as described herein, may be implemented, in accordance with various embodiments.

Described herein is, among other things, a network hub that improves networking functionality for connected devices in communication with the network hub. For instance, the network hub can be used as an extender of radio coverage to augment or improve radio coverage for one or more devices (e.g., mobile devices) in the vicinity of the network hub. Additionally, or alternatively, the network hub can operate as a gateway device that delivers various network-related services via connected devices. Such services may include, without limitation, IoT services, content delivery services, and the like. It is to be appreciated that the operation of the network hub is not limited to the aforementioned, example use cases, and that other types of functionality and use cases will be described in more detail herein, and appreciated by those skilled in the art.

The network hub described herein may be field programmable (e.g., upgradeable). For example, the network hub may include a configurable software defined radio (SDR) with software for the configurable SDR that can be modified, changed, replaced, or otherwise upgraded. For instance, a software package can be pushed to the network hub in order to dynamically configure (or manipulate) the configurable SDR, which allows for the implementation of any desired radio technology (e.g., 2G, 3G, 4G, 5G, etc.), all without changing the hardware platform of the network hub. Thus, the configurable SDR allows the network hub to adapt to different (e.g., new) radio technologies "in the field" via software updates, without any change to the hardware platform of the network hub. An example process implemented by a network hub in this context may include operating the network hub with first settings for a configurable SDR, receiving an update from a server computer over a computer network, installing the update, and rebooting the network hub. Upon installation of the update, settings of the configurable SDR may be changed from the first settings to second, different settings, the second, different settings causing the network hub to operate using a second cellular-based radio technology that is different from a first cellular-based radio technology enabled by the first settings of the configurable SDR.

Technical benefits of a field-programmable network hub are numerous. For example, fielded units (i.e., network hubs that are already purchased and used by end users) can be upgraded to be compatible with a new radio technology. For instance, when a new radio technology emerges, a server computer can push a new software update (e.g., a software stack, package, or build) to the network hub, which, upon installation, modifies the settings of the configurable SDR to implement the new radio technology. This can be done at scale for a large number of fielded units so that a device manufacturer and/or carrier can provide its customers with products that are compatible with a new radio technology in a shorter time frame, as compared to the time it takes a manufacturer to design, test, and manufacture a brand new hardware radio platform (and corresponding software) to support the same radio technology. In other words, a carrier that provides its customers with the network hub described herein can significantly reduce the time and resources to bring a new radio technology to market by avoiding a rebuild of the hub's hardware, and, instead, repurposing the hardware platform already deployed in the fielded units via a software update that renders the fielded units compatible with a new radio technology. Other technical benefits may be realized, as described herein, without limitation to this example.

The network hub described herein may also be configured to dynamically select a desired frequency (among available licensed spectrum holdings of a carrier) at which to operate. For example, the network hub may be configured to select a frequency among multiple available frequencies that are available from (i.e., allocated to) a given carrier in a particular geographic area, and the configurable SDR of the network hub can be manipulated (or re-configured, settings changed, etc.) to operate at the selected frequency in order to provide improved Quality of Service (QoS) to one or more connected devices (e.g., a mobile phone) in the vicinity of the network hub, all without changing the hardware platform of the network hub. In other words, the configurability of the SDR enables the network hub to "come up" on the best frequency available in a particular geographic location. An example process implemented by a network hub in this context may include sending a current geographic location of the network hub to a server computer, receiving, from the server computer, multiple available frequencies at which the configurable SDR can be configured to operate, performing a network scan to determine respective current conditions of individual frequencies of the multiple available frequencies, selecting a particular frequency based at least in part on the current conditions of the individual frequencies, and configuring the configurable SDR to operate at the selected frequency.

The network hub described herein may also be unlockable into a development environment at various levels of access. This feature is sometimes referred to herein as "tiered developer unlock" to indicate the different levels of access at which users can unlock the network hub into a development environment. A remote management system (or service) may, upon request, issue a user of a network hub a device-specific certificate associated with the particular network hub and with a particular access level, which enables the requesting user to unlock the network hub into a development environment at the requested level of access. "Unlocking" the network hub, in this context, may comprise unlocking a bootloader of the network hub. Whether a bootloader, or a similar secure component of the network hub is unlocked, the unlocking functionality grants a user access to otherwise secure areas of the network hub for purposes of flashing custom firmware and/or software, depending on the level of access granted to the user. An example process implemented by a network hub in this context includes sending a request to a server computer for a certificate (e.g., a device-specific certificate) that is usable to unlock the network hub into a development environment, the request including (i) a requested level of access, and (ii) a device identifier (ID) associated with the network hub. The process may continue by the network hub receiving the certificate from the server computer, rebooting the network hub, determining whether the certificate is associated with a trusted entity, and, if so, unlocking the network hub into the development environment at the requested level of access as an unlocked network hub, wherein the unlocked network hub allows for development activities (e.g., flashing custom firmware and/or software) at the requested level of access. The various levels of access at which a network hub can be unlocked into a development environment allows for limiting particular users' access to contained areas of the network hub, and thereby precluding these users' ability to change secure areas/functionality of the network hub, such as by preventing particular users from changing the settings of the configurable SDR of the network hub.

Providing tiered developer unlocking of the network hub results in numerous technical benefits. For example, tiered developer unlocking mitigates the risk of causing the network hub to operate unlawfully. For instance, in the United States, the Federal Communications Commission (FCC) and the National Telecommunications and Information Administration (NTIA) administer radio spectrum (i.e., the radio frequency (RF) portion of the electromagnetic spectrum) for non-Federal use and Federal use, respectively. A tiered, certificate-based approach to unlocking the network hub for developer access, as described herein, allows for abstracting the network hub's secure areas and functionality (e.g., the setting of the configurable SDR) away from users who are not permitted the requisite level of access to change/modify such secure areas/functionality. This mitigates the risk of a user changing (either purposefully or accidentally) secure functionality, such as the settings of the configurable SDR, which might cause the network hub to operate unlawfully in licensed spectrum held by another entity (e.g., another carrier) that is not associated with the user of the network hub. Nevertheless, a user that is restricted from accessing one or more secure areas/functionalities of the network hub is still permitted to unlock the network hub into a development environment at a restricted, lower level of access so that the user can still load and execute custom (e.g., unsigned) applications on the network hub. Thus, the development community can unlock off-the-shelf network hubs to develop new technologies.

The network hub described herein may also be configured to operate as a "zero-configuration" IoT gateway device. For instance, the network hub can operate as a gateway device by communicating (e.g., exchanging data) with one or more IoT devices in the vicinity of the network hub that provide various IoT services, and allowing a user to remotely access, via a mobile device, an environment where the one or more IoT devices are located. This may allow the user to access/receive IoT device information, change IoT device settings, and/or operate (e.g., turn on/off) IoT devices from any location, even those locations that are remote from the environment where the IoT device(s) is/are located. In addition, remote access to IoT services via the network hub may be relatively "seamless" in the sense that there may be little to no configuration required on the user's part (hence the term "zero-configuration") in order to remotely access the services.

The network hub may also be configured to implement a firewall policy in order to restrict access, by designated applications executing on the network hub, to particular IoT data from designated IoT devices. For instance, an application executing on the network hub may be associated with one or more IoT devices so that data received from the IoT device(s) is received by the associated (designated) application, and not by other applications. In some embodiments, an IoT device broker of the network hub may be further configured to implement a firewall policy to manage data exchange between particular IoT devices and applications running on the network hub. An example process implemented by a network hub in this context includes receiving data packets from an IoT device, analyzing the data packets against a firewall policy stored in memory of the network hub to determine whether an application executing on the network hub is allowed to receive at least a portion of data within the data packets, and allowing/denying the application access to at least some of the data based at least in part on the firewall policy. Thus, the firewall policy can be used by the IoT device broker of the network hub to determine whether an application is to receive any data at all from a particular IoT device, and, if so, what data the application is allowed to receive if the application is allowed to receive some, but not all of the data. This may involve denying the application access to at least some of the data received from the IoT device. This IoT firewalling technique allows particular applications executing on the network hub exclusive access to particular data received from particular (designated) IoT devices in the vicinity of the network hub.

Although the techniques and systems disclosed herein are often described with respect to telephony-based radio technologies and protocols, this disclosure is not limited to implementations using cellular or telephony-based protocols, and may be utilized to implement any radio technology that utilizes the RF portion of the electromagnetic spectrum.

Also disclosed herein are systems comprising one or more processors and one or more memories, as well as non-transitory computer-readable media storing computer-executable instructions that, when executed, by one or more processors perform various acts and/or processes disclosed herein.

FIG. 1 illustrates an example network environment 100 in which a network hub 102, as described herein, may be implemented, in accordance with various embodiments. As shown in FIG. 1, the network hub 102 is configured to communicate with, and connect to, a telecommunications network 104. The communication between the network hub 102 and the telecommunications network 104 may occur directly, or, alternatively, indirectly through a conventional radio access network (RAN) 106, such as the RAN 106(A) shown in FIG. 1. The RAN 106(A) shown in FIG. 1 may represent a cell site (or cell tower), a base station, an eNodeB, or any other suitable type of RAN 106. The RAN 106(A) may be owned, leased, and/or operated by an operator of the telecommunications network 104, such as a wireless carrier (or simply "carrier") of Internet Protocol Multimedia Subsystem (IMS)-based services that are provided to subscribing users over the telecommunications network 104.

The network hub 102 may be implemented as any suitable device configured to communicate over a wireless and/or wireline network(s). In some embodiments, the network hub 102 may be situated in an environment 108 where other connected devices may be located. The environment 108 shown in FIG. 1 is representative of a dwelling, such as a house of a user 110, but the environment 108 is not limited to a dwelling or even a physical structure. In the scenario of the environment 108 including a dwelling, as depicted in FIG. 1, the network hub 102 may be situated in, on, or near (e.g., within a threshold distance from) the dwelling. The network hub 102, as its name implies, may be configured to operate as a "hub" device that is communicatively interposed between various connected devices, both within the environment 108 where the network hub 102 is located, and within the telecommunications network 104.

In some embodiments, the network hub 102 may be configured with radio functionality, as described in more detail below, which may be leveraged to provide, augment, and/or improve radio coverage for other connected devices in the vicinity of the network hub 102, such as a mobile device 112 (e.g., a smart phone, tablet, etc.) associated with the user 110 in FIG. 1. When the network hub 102 is in direct communication with the telecommunications network 104 (i.e., when communications are not sent through a conventional RAN 106(A)), the network hub 102 may, itself, operate as a RAN for a connected device, such as the mobile device 112, in order to provide the mobile device 112 access to the telecommunications network 104, which may be useful at a location where the user 110 and his/her associated mobile device 112 may otherwise not have suitable radio coverage. When a RAN 106(A) is located within a threshold distance of the environment 108 where the mobile device 112 and network hub 102 are located, the network hub 102 may operate as an extender of radio coverage to the mobile device 112, which may provide service to the mobile device 112 when the location of the mobile device 112 does not permit wireless communication at all, or at a sufficient QoS level. In some embodiments, radio coverage may be limited at a particular location due to poor/limited, or nonexistent, radio coverage at the particular geographic location, or due to the mobile device 112 being situated indoors and/or underground where radio coverage may be poor/limited, or nonexistent. The network hub 102 may provide sufficient cellular radio coverage (e.g., 2G, 3G, 4G, 5G, etc.) to the mobile device 112 in these instances.

In some embodiments, the network hub 102 may be configured to operate as a gateway device that delivers services including, without limitation, IoT services, content (e.g., multimedia) delivery services, and the like. For instance, a service provider(s) 114 may deliver content to the mobile device 112 (or any other connected device in the environment 108) of the user 110 via the telecommunications network 104 and via the network hub 102. The content delivered by the service provider(s) 114 can be any suitable type of content (e.g., video, music, multimedia, etc.) which can be streamed and/or downloaded to, and thereafter consumed by the user 110 on, any suitable endpoint device, such as a mobile phone, a tablet computer, a laptop computer, a portable digital assistant (PDA), a wearable computer (e.g., electronic/smart glasses, a smart watch, fitness trackers, etc.), a networked digital camera, a speaker, a television in the environment 108. The mobile device 112 shown in FIG. 1 represents a mobile phone, but there may be additional endpoint devices in the environment 108 that are configured to receive content from a service provider(s) 114 via the network hub 102.

As another example, a service provider(s) 114 may provide IoT services via the network hub 102. In this manner, the environment 108 may include one or more IoT devices 116(1), 116(2), . . . , 116(N) (collectively 116) in the vicinity of the network hub 102. FIG. 1 shows the IoT devices 116 as being situated in or on a dwelling. As mentioned, a dwelling is not required to implement the techniques and systems described herein. Nevertheless, the dwelling shown in FIG. 1 may represent an example type of environment 108 that the network hub 102 and the one or more IoT devices 116 are situated in or near (e.g., within a threshold distance from the dwelling), according to various embodiments.

An individual IoT device 116 may represent any suitable IoT object (e.g., an appliances, a sensor, etc.) that has an addressable interface (e.g., an Internet Protocol (IP) address, a Bluetooth identifier (ID), a near-field communication (NFC) ID, etc.) and can exchange information and/or data with one or more other devices (e.g., the network hub 102) over a wireless and/or wireline network(s). An individual IoT device 116 may include a passive communication interface (e.g., a quick response (QR) code, a radio frequency identification (RFID) tag, an NFC tag, etc.), and/or an active communication interface (e.g., a modem, a transceiver, etc.). An individual IOT device 116 can further include a particular set of attributes (e.g., a device state or status, such as whether the IoT device 116 is on or off, open or closed, idle or active, available for task execution or busy, and so on). Example IoT devices 116 include, without limitation, thermostats, appliances (e.g., refrigerators, ovens, dishwashers, clothes washers/dryers, furnaces, etc.), sensors (e.g., cameras, light sensors, weather sensors, temperature sensors, electricity meters, gas meters, etc.), output devices (e.g., televisions, speakers, etc.), lights, vacuums, robots, and the like. So long as the IoT device 116 is equipped with appropriate electronics and an addressable communications interface for communicating with one or more connected devices, such as the network hub 102, the IoT devices 116 may represent any conceivable object/device. It is to be appreciated that, although the dwelling (representative of the environment 108 in FIG. 1) is depicted as a residential home of a user 110, the techniques and systems described herein are not limited to residential applications, and can be extended to industrial settings in a similar manner, such as a factory with a plurality of IoT devices 116 (e.g., sensors, robotic assembly devices, etc.). Thus, the environment 108 may represent any suitable structure, such as an industrial structure (e.g., a warehouse, factory, etc.). However, the environment 108 is not limited to a structure, and, accordingly, the environment 108 may represent any indoor or outdoor (e.g., a farm) environment 108 in which the network hub 102 can be situated along with one or more IoT devices 116, and possibly along with other connected devices, such as the mobile device 112.

As shown in FIG. 1, when the user 110 travels from a first geographic location 118(A) in or near the environment 108 to a second geographic location 118(B) that is remote from the environment 108, the network hub 102 may be configured to operate as an access gateway that allows the user 110 to access information and/or data provided by the IoT devices 116 within the environment 108, and/or to change settings of, or operate (e.g., turn on/off) the IoT devices 116 from the remote geographic location 118(B). Thus, the user 110 can "tunnel" into the environment 108 where the IoT devices 116 are located by accessing the telecommunications network 104 via a nearest RAN 106(B) using the mobile device 112, where the access is enabled via the network hub 102 located in the environment 108 with the IoT devices 116.

The network hub 102 may be capable of communicating over wired networks, and/or wirelessly, using any suitable communications/data technology, protocol, or standard, such as Global System for Mobile Communications (GSM), Time Division Multiple Access (TDMA), Universal Mobile Telecommunications System (UMTS), Evolution-Data Optimized (EVDO), Long Term Evolution (LTE), Advanced LTE (LTE+), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), Voice over LTE (VoLTE), IEEE 802.1x protocols, WiMAX, Wi-Fi, and/or any future IP-based network technology or protocol, or any evolution of an existing IP-based network technology or protocol.

As mentioned, the connection between the network hub 102 and the telecommunications network 104 may be direct, or it may be indirect, such as by sending/receiving data via the RAN 106(A). In either case, this connection may be enabled via a dedicated backhaul or similar private network between the network hub 102 and the telecommunications network 104. Furthermore, the telecommunications network 104, or portions thereof, may be maintained and/or operated by one or more service providers, such as one or more wireless carriers ("carriers"), who provide mobile IMS-based services to subscribing users. Such service providers may be the same or different from the service providers 114 shown in FIG. 1. The user 110 may represent a subscriber of IMS-based services, and the user 110 may therefore be provided such services via his/her associated devices. For example, the user 110 may utilize his/her mobile device 112 to communicate with other users and devices. Additionally, or alternatively, the user 110 may utilize his/her mobile devices 112 to receive, provide, or otherwise interact with various different IMS-based services by accessing the telecommunications network 104. For example, a carrier may offer multimedia telephony services (e.g., Voice over LTE (VoLTE) services, Wi-Fi calling services, etc.) that allow the user 110 to call or message other users via the telecommunications network 104. A carrier may offer any type of IMS-based services in addition to multimedia telephony services, such as services that include, without limitation, emergency services (e.g., E911), gaming services, instant messaging services, presence services, video conferencing services, social networking and sharing services, location-based services, push-to-talk services, and so on. In some cases, as described herein, access to one or more of these services may be provided via the network hub 102.

The telecommunications network 104, and the other networks (e.g., network 124) shown and/or described herein, may represent any suitable type of network known to a person having ordinary skill in the art. For instance, the telecommunications network 104 may include various subsystems 120(1), 120(2), . . . , 120(P) (collectively 120), as well as nodes within the subsystems 120, which enable communication between various connected devices in the environment 100. For example, the telecommunications network 104 may include a first subsystem 120(1), which may represent an Evolved Packet Core (EPC), a second subsystem 120(2), which may represent an IMS core, as well as additional subsystems 120. IMS is an architectural framework for delivering IP multimedia to connected devices that are associated with users of the IMS network. An IMS core network (sometimes referred to as the "IMS core", or the "Core Network (CN)") permits wireless and wireline devices to access IP multimedia, messaging, and voice applications and services over the telecommunications network 104.

The IMS core network (which may be a subsystem 120 of the telecommunications network 104 in FIG. 1) may itself include multiple nodes that are configured for various purposes, such as control and management of multimedia sessions of the telecommunications network 104. Such nodes may include, without limitation, a Gateway GPRS Support Node (GGSN), Serving GPRS Support Node (SGSN), or similar components that facilitate mobility management, session management, and transport for IP packet services. In addition, the nodes of the IMS core may include, without limitation, various Call Session Control Function (CSCF) nodes that provide SIP registrar and proxy functionality, such as a proxy CSCF (P-CSCF), an interrogating CSCF (I-CSCF), a serving CSCF (S-CSCF), an emergency CSCF (E-CSCF), and the like, a security gateway (SEG), a session border controller (SBC), and/or a home subscriber server (HSS), and so on. In some embodiments, the IMS core network interfaces with a public switched telephone network (PSTN), which may be represented by the subsystem 120(P).

As described in more detail elsewhere in this disclosure, the network hub 102 may be field programmable (e.g., upgradeable). In this manner, a management system 122 may be configured to send (or push) over-the-air (OTA) software packages (e.g., updates) over a computer network(s) 124, such as the Internet or any similar type of network(s). An update, when received and installed on the network hub 102, manipulate the configurable SDR of the network hub 102 so that the network hub 102 operates using one of various different radio technologies (e.g., cellular radio technologies, such as 2G, 3G, 4G, 5G, etc.). This may be useful for re-purposing the network hub 102 to be compatible with a newly-developed radio technology, or to provide the network hub 102 with a radio technology that is suitable for its geographic location and/or suitable for connected devices in the vicinity of the network hub 102. In this regard, the network hub 102 is "future proof" because any desired (e.g., a new) radio technology can be deployed on the network hub 102 via a software update that is pushed from the management system 122 and received by the network hub 102. The network hub 102 may also be configured to dynamically select a desired frequency (among available licensed spectrum holdings of a carrier) at which to operate, such as by performing a network scan to determine conditions associated with individual frequencies of the available frequencies in a geographic location, and by selecting a best available frequency at which to operate. The network hub 102 may also be unlockable into a development environment at various levels of access via a certificate-based approach to implement tiered developer unlocking of the network hub 102. The network hub 102 may also be configured to operate as a zero-configuration IoT gateway device that is configured to implement firewalling of IoT data.

Figure 2:
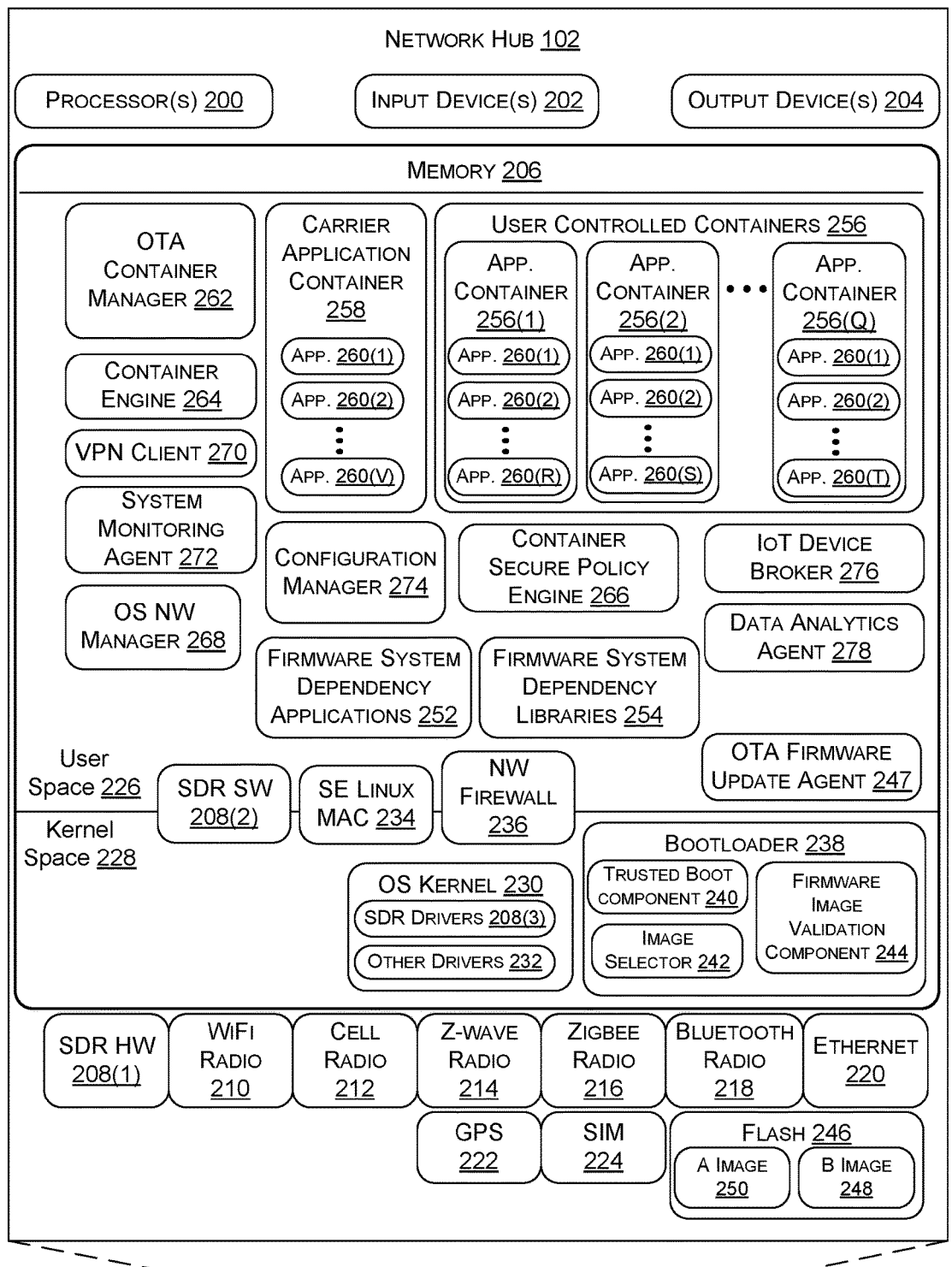
FIG. 2 is a block diagram of an example network hub architecture in accordance with various embodiments.

FIG. 2 is a block diagram of an example network hub 102 architecture in accordance with various embodiments. As shown, the network hub 102 may include one or more processors 200. The processor(s) 200 may comprise one or more central processing units (CPUs), graphics processing units (GPUs), or any similar type of processor(s) 200.

The network hub 102 may further include one or more input devices 202, including, without limitation, a touch screen (e.g., touch, or proximity-based) display, physical buttons (e.g., keyboard or keypad), a camera-based sensor configured to receive gestural input from a user 110, a microphone or microphone array for receiving voice input commands from a user 110, pointing devices (e.g., mouse, pen, stylus, etc.), or any other suitable input device(s) 202. The network hub 102 may further include one or more output devices 204, including, without limitation, a display, speakers, a printer, or any other suitable output device(s) 204.

The network hub 102 may further include one or more forms of non-transitory computer-readable media 206 (shown as "memory" 206 in FIG. 2). The network hub 102 may also include additional storage devices. Such additional storage may include removable storage and/or non-removable storage.

In various embodiments, the non-transitory computer-readable memory 206 generally includes both volatile memory and non-volatile memory (e.g., random access memory (RANI), read-only memory (ROM), erasable programmable read-only memory (EEPROM), Flash Memory, miniature hard drive, memory card, optical storage, magnetic cassettes, magnetic tape, magnetic disk storage or other magnetic storage devices, or any other non-transitory medium). The computer-readable memory 206 may also be described as computer storage media and may include volatile and nonvolatile, removable and non-removable media implemented in any method or technology for storage of information, such as computer readable instructions, data structures, program modules, or other data. Non-transitory computer-readable memory 206, as well as any other removable and/or non-removable storage of the network hub 102 that are described herein, are all examples of non-transitory computer-readable media (also referred to as "computer-readable storage media"). Computer-readable storage media include, but are not limited to, RAM, ROM, EEPROM, flash memory or other memory technology, compact disc read-only memory (CD-ROM), digital versatile disks (DVD) or other optical storage, magnetic cassettes, magnetic tape, magnetic disk storage or other magnetic storage devices, or any other non-transitory computer-readable medium which can be used to store the desired information and which can be accessed by the network hub 102. Any such computer-readable storage media may be part of the network hub 102.

The network hub 102 may further include various communications connection(s) that allow the network hub 102 to communicate with other connected devices. Such communication connections may include, without limitation, one or more of a software defined radio (SDR) hardware (HW) component(s) 208(1), a WiFi radio 210, a cellular radio 212, a Z-Wave™ radio 214, a Zigbee™ radio 216, a Bluetooth™ radio 218, and/or an Ethernet interface 220, among other communication connections that may be present in the network hub 102. One or more of the network hub's 102 communications connections may facilitate transmitting and/or receiving wired and/or wireless signals over any suitable communications/data technology, standard, or protocol, such as those described herein, and by using licensed, semi-licensed, or unlicensed spectrum over a telecommunications network 104.

The network hub 102 may further include a location determination module 222 (shown as a "Global Positioning System (GPS)" receiver 222 in FIG. 2) configured to determine a current geographic location of the network hub 102. Although shown as a GPS receiver 222 in FIG. 2, any suitable location determination technology can be utilized for determining a current geographic location of the network hub 102. Any determined geographic location of the network hub 102 may be specified as, without limitation, a latitude-longitude pair, a geodetic location, a physical mailing address, or any other suitable geographic location information.

The network hub 102 may further include a Subscriber Identity Module (MI) 224 which may be issued to a subscriber, such as the user 110, to allow the subscriber to gain access to IMS-based services of a carrier over the telecommunications network 104. The SIM 224 may comprise a physical SIM card, and/or an electronic SIM (eSIM) persisted in a secure element of the network hub 102.

The SDR hardware 208(1) represents a hardware portion (e.g., one or more hardware components, such as a physical antenna, etc.) of a configurable SDR 208. The remaining portion(s) of the configurable SDR 208 may be implemented in software, as shown by the SDR software 208(2) and/or the SDR drivers 208(3) within the operating system (OS) kernel 230 of the network hub 102. In this manner, the SDR 208, as a whole, is not exclusively hardware, and is configured to provide different radio technologies independently of the SDR hardware 208(1) by virtue of the SDR SW 208(2) and/or the SDR driver(s) 208(3). Hereinafter, the referenced numeral "208" is used to refer to the configurable SDR 208, in general, but it is to be appreciated that the configurable SDR 208 includes a combination of hardware (i.e., the SDR hardware 208(1)) and software (i.e., the SDR software 208(2) and/or the SDR driver(s) 208(3)).

The network hub 102 may be configured to change the settings of the configurable SDR 208 to provide the network hub 102 with different radio technologies, such as different cellular-based radio technologies, and/or to operate at different frequencies in available RF spectrum. In this manner, the radio functionality of the network hub 102 is made flexible, and can be dynamically changed via the configurable SDR 208 of the network hub 102. As an example, the network hub 102 can be configured to support LTE, while another network hub leveraging the same hardware platform as the network hub 102, or the same network hub 102 at a later time, can be configured to support GSM, 5G radio technology, LTE Direct, LoRa™, Satalite, or any other radio technologies, such as those that are not native to the platform of the network hub 102. The configurable SDR 208 works in combination with other radio technologies described herein (e.g., WiFi, ZWave, ZigBee, etc.), and/or with other wireline communication technologies (DOCIS, Ethernet, Fiber, etc.) that may be present within the platform of the network hub 102.

The configurable SDR 208 may be operated to transmit and/or receive radio signals by setting a particular center point frequency, through an expected range of operation, with a set amount of bandwidth. For example, a spectrum (sometimes referred to as a "spectrum swath") that the configurable SDR 208 is configured to operate within can be set to range from a lower bound (e.g., 300 megahertz (MHz)) to an upper bound (e.g., 3.6 gigahertz (GHz)). The lower and upper bounds of the spectrum swath may be limited by the SDR hardware 208(1), and the example range described herein is merely provided for illustrative purposes, and not limitation. For example, the SDR hardware 208(1) may support a wider or narrower spectrum swath, such as a spectrum swath having an upper bound of 100 terahertz (THz), and/or a lower bound of 50 MHz, without departing from the basic characteristics of the techniques and systems described herein.

Within the spectrum swath (e.g., 300 MHz to 3.6 GHz), the SDR 208 can define a "slice of air" that is centered at a particular center point frequency, the "slice of air" being defined by a width in terms of the same frequency-based units of the spectrum swath, such as a width of 50 MHz. When receiving radio signals, the configurable SDR 208 is configured to detect radio signals in the designated "slice of air," and when transmitting radio signals, the configurable SDR 208 is configured to transmit radio signals in the designated "slice of air." To enable a duplex communication system, the configurable SDR 208 can define a first center point frequency for receiving radio signals, and a second, different center point frequency for transmitting radio signals, the "slice of air" for each of the receive and the transmit functions may be defined with different widths or the same width. In some embodiments, a guard band may be defined between the two "slices of air" in the duplex communication scenario. Whether or not duplex communication is enabled, the defined "slice of air" (e.g., 50 MHz slice) can be shifted one way or the other within the spectrum swath (e.g., within the 300 MHz to 3.6 GHz spectrum swath). When radio signals are received via the configurable SDR 208, the signals are sent to a processor (e.g., a processor embedded in the SDR hardware 208(1), and/or the processor(s) 200), which then processes the received radio signals to interpret the signals. This may involve the use of one or more filtering engines to filter the received signals.

As shown in FIG. 2, the computer-readable memory 206 may include various modules, data structures, and/or processor-readable instructions that are configured to execute in user space 226, in kernel space 228, or partially in the user space 226 and partially in the kernel space 228 of the network hub 102. The user space 226 and the kernel space 228 (sometimes called user mode and kernel mode, respectively) of the network hub 102 correspond to protection domains—also known as rings—that protect data and functionality of the network hub 102 from faults and malware. Typically, the user space 226 is associated with the outermost ring and the least level of privileges to access memory and functionality, while the kernel space 228 is associated with an inner ring (sometimes the innermost ring, although in modern computing devices there is sometimes an additional level of privilege) and a higher level of privileges, as compared to the user space 226, to access memory and functionality, including operating system processes. As shown in FIG. 2, the SDR software 208(2) may execute partially in the user space 226 and partially in the kernel space 228.

An operating system (OS) kernel 230 may execute in the kernel space 228 of the network hub 102. The OS kernel 230 may be a kernel of any type of OS, such as a Linux kernel, a Windows™ kernel, a Mac™ kernel, or any other type of OS kernel 230. The OS kernel 230 may have load and unload functions for loading and unloading components, and may include the aforementioned SDR drivers 208(3), as well as other drivers 232 (e.g., network drivers 232) to enable various different functionalities described herein.

Another component that may execute partially in the user space 226 and partially in the kernel space 228 is a Security Enhanced (SE) Linux mandatory access control (MAC) component 234. The SE Linux MAC component 234 may provide a security mechanism for supporting access control security policies, such as security policies that control a user's and/or an application's access to files on the network hub 102. Although this component 234 is shown in FIG. 2 as a Linux-based security mechanism, it is to be appreciated that the security mechanism 234 can be utilized in other types of OS's (e.g., non-Linux OS's). A network firewall 236 may also execute partially in the user space 226 and partially in the kernel space 228, and may be configured to implement a general firewall policy for network traffic being sent from, and received by, the network hub 102.

A bootloader 238 may execute in the kernel space 228 of the network hub 102. The bootloader 238 may be the first code that is executed when the network hub 102 is initialized (e.g., powered on, rebooted, etc.). For example, the bootloader 238 may be executed before any of the main software programs (e.g., the OS kernel 230) even start to execute on the network hub 102. The bootloader 238 may include a trusted boot component 240, an image selector 242, and a firmware image validation component 244.

Firmware updates for the network hub 102 may occur via an OTA update sent from the management system 122 of FIG. 1. Firmware on the network hub 102 may be installed and persisted in an AB configuration, as shown in FIG. 2. For example, when a signed firmware update is available, an OTA firmware update agent 247 executing in the user space 226 of the network hub 102 may begin downloading the firmware update into a B partition of non-volatile memory, such as a "B Image" 248 portion of flash memory 246, where the B Image 248 represents the updated firmware image. Upon completion of the download, and upon validation of a firmware signature by the firmware image validation component 244, the firmware can be flashed to the secondary partition as the B image 248, and the image selector 242 of the bootloader 238 may then select the B image 248 and may attempt to boot the B image 248. If an error occurs (as detected by the trusted boot component 240 of the bootloader 238), the bootloader 238 may revert to the original, A image 250 in an A partition of the non-volatile memory, where the A image 250 represents the original firmware image that was persisted prior to the received firmware update. In this scenario (e.g., an error occurs when attempting to boot the B image 248), the trusted boot component 240 of the bootloader 238 may report a failure. If, on the other hand, an error does not occur during the booting of the B image 248, the B image 248 is booted, and the trusted boot component 240 of the bootloader 238 may report a successful boot of the updated firmware. In response to a successful boot of the B image 248, the A image 250 partition may be made available (e.g., erased and/or unallocated in the non-volatile memory) for a future firmware update. When firmware of the network hub 102 is executed by the processor(s) 200 of the network hub 102, firmware system dependency applications 252 and firmware system dependency libraries 254 may be referenced for proper execution of the firmware on the network hub 102.

As described in more detail herein, the bootloader 238 may be unlockable to allow a user access to a development environment at various levels of access (i.e., tiered developer unlock). A certificate-based approach may be used to enable tiered unlocking. In this approach, a certificate issued by the management system 122 may be device-specific (e.g., exclusively usable to unlock the network hub 102, and not usable to unlock any other devices, including other network hubs), and may also be associated with a requested level of access. For example, a particular developer may be granted a relatively high level of access to flash custom firmware on the network hub 102, and/or to change secure settings, such as the SDR 208 settings. Meanwhile, a different user/developer may be granted a lower level of access, which limits the development access of the user to that of loading custom applications in a contained space within the computer-readable memory 206, and prevents the user from accessing one or more secure areas and changing secure functionality of the network hub 102. For instance, a user with a relatively low level of access to a development environment of the network hub 102 may not be allowed to change the settings of the configurable SDR 208.

In some embodiments, the network hub 102 includes a mechanism to maintain separation between applications executing on the network hub 102, and/or between the hardware platform of the network hub 102 and designated applications. FIG. 2 shows an example mechanism of using "containers" 256 and 258 to maintain this separation. Although containers 256/258 are shown in FIG. 2 by way of example as a suitable separation mechanism, it is to be appreciated that other mechanisms, such as virtual machines (VMs), can be used to maintain the aforementioned separation between applications and/or between hardware and applications. In either case, a separation mechanism may enable one or more first applications executing on the network hub 102 to be decoupled from one or more second applications executing on the network hub 102, from the firmware executing on the network hub 102, and/or from the underlying hardware of the network hub 102.

The example of FIG. 2 shows user controlled containers 256, which may include one or more user application containers 256(1), 256(2), . . . , 256(Q), and one or more carrier application containers 258. Each container 256, 258 may contain one or more applications 260 such that each application 260 may execute within its corresponding container 256, 258. In the additional or alternative VM embodiment, introduced above, each application 260 may execute within its corresponding VM. This allows any kernel specific functions to operate within a VM or a container 256, 258 in a manner that is agnostic to the hardware platform. In the container embodiment, an application 260 executing within a container 256, 258 may share the OS kernel 230, but any software dependencies may be contained within the container 256, 258. In the VM embodiment, the firmware of the network hub 102 may provide hypervisor functionality for any VM running on top of the firmware software. In some embodiments, an individual carrier application container 258 may include applications 260(1)-(V), such as, without limitation, a user application suite, a user container store user interface, language packages, a language runtime environment, OS packages, and/or a base image.

In general, applications 260 may be updated via updates received by an OTA container manager 262 from the management system 122. In some embodiments, the OTA container manager 262 may include sub-components such as, without limitation, a container management agent, a container key performance indicator (KPI) agent, language packages, a language runtime environment, OS packages, and/or a base image. Any of the applications 260(1)-(V) may represent one or more of these sub-components.

Because the applications 260 that execute on the network hub 102 may be decoupled from the firmware by way of VMs and/or application containers 256, 258, the applications 260 can be separated from the primary firmware of the network hub 102 and can be managed at scale. Since the firmware is decoupled from the applications 260, this allows the firmware to be maintained independently of the applications 260, and at a different (e.g., less frequent) interval. Containerized application 260 deployment also allows applications 260 (which may be deployed by a user 110, a carrier, or a third party) to be launched with application 260 dependencies utilized by a service. This allows two competing applications 260 to define their own application 260 requirements and receive pushed updates without having to understand lower level details or hardware of the OS kernel 230.

A container engine 264 may execute in the user space 226 of the computer-readable memory 206, and may be configured to manage the applications 260 that execute on the network hub 102 by allocating the applications 260 between the user controlled containers 256 and the carrier application container(s) 258. A container secure policy engine 266 may execute in the user space 226 of the computer-readable memory 206, and may be configured to enable secure segmentation, which allows the network hub 102 to grant access to specific subcomponents based on permissions set within the application 260. Components and/or applications 260 with the right permissions may be granted access to the configurable SDR 208, while other components and/or applications 260 may be restricted or prevented from accessing the configurable SDR 208, while being granted access to other communications connections and radio technologies (e.g., WiFi, Z-Wave, Zigbee, Bluetooth, etc.). This provides the ability to adhere to regulatory requirements that would be placed on a network hub 102 with a configurable SDR 208 so that the network hub 102 cannot run in licensed spectrum held by other entities, and/or access system functionality of the network hub 102 without going through a more rigorous application vetting process. An OS network manager 268 may interact with the container secure policy engine 266 to further manage whether components and/or applications 260 are permitted to access functionality of the OS kernel 230, as well as network functionality.

A virtual private network (VPN) client 270 may enable user-initiated VPN access to connected devices in communication with the network hub 102. For example, the user 110, when located at a remote geographic location 118(B) (i.e., remote from an environment 108 where the network hub 102 and one or more connected devices (e.g., the IoT devices 116) are located), may obtain VPN access to connected devices (e.g., the IoT devices 116) in the environment 108 using a mobile device 112 exchanging data with the network hub 102 via the VPN client 270. This may allow the user 110 to access files stored on a computer (e.g., a laptop, desktop, etc.) within the environment 108 that is connected to the network hub 102, and/or to access IoT device 116 information, change settings of, and/or control, one or more of the IoT devices 116 in the environment 108.

A system monitoring agent 272 may execute in the user space 226 of the computer-readable memory 206, and may be configured to monitor performance metrics, such as KPIs, associated with the network hub 102, and may send the performance metrics to the management system 122 for further analysis and consumption.

A configuration manager 274 may execute in the user space 226 of the computer-readable memory 206, and may be configured to control, manipulate, or otherwise reconfigure the SDR 208 of the network hub 102. For example, the configuration manager 274 may be configured to cause particular code in the SDR software 208(2) to be loaded and/or executed, and/or cause particular SDR drivers 208(3) to be loaded and/or executed in order to set the configurable SDR 208 to operate at a desired frequency. The configuration manager 274 may also handle updates (e.g., software updates) for the SDR software 208(2) and/or the SDR drivers 208(3), which may be received OTA from the management system 122. For example, an update to the SDR software 208(2), when received and installed on the network hub 102, may cause the settings of the configurable SDR 208 to be changed in order to implement a particular radio technology, such as a cellular-based radio technology (e.g., 4G, 5G, etc.). Thus, the configuration manager 274 allows for field programmability (e.g., upgradeability) and/or dynamic selection of a desired frequency at which to operate the configurable SDR 208 for flexibility in the radio technologies and/or frequencies that can be employed by the network hub's 102 SDR 208.

An IoT device broker 276 may execute in the user space 226 of the computer-readable memory 206, and may be configured to create a publish/subscribe model for IoT devices 116 that are communicatively connected (or connectable) to the network hub 102. Note that the IoT device broker 276 executes outside of the containers 256, 258. Thus, the IoT device broker 276 allows a user 110, and/or a carrier, to establish rules that govern where and how data received from a particular IoT device 116 can be shared with the rest of the components of the network hub 102. The rules implemented by the IoT device broker 276 may associate applications 260 with IoT devices 116. These associations can be one-to-one, one-to-many, or many-to-one. By executing the IoT device broker 276 outside of the containers 256, 258, data received from IoT devices 116 may be pushed to the container engine 264 and shared between components (e.g., applications 260) effectively by multiplexing the IoT device 116 data while also firewalling messages received from IoT devices 116 based upon a firewall policy (which can be set by the user 110 or the carrier). Thus, access (e.g., firewall) policies can be configured for each of the applications 260 for determining which IoT devices 116 and what IoT device 116 data (e.g., some, all, none) the applications 260 are allowed to access/receive. For example, a firewall policy implemented by the IoT device broker 276 may filter specific message types, or types of data, received from an IoT device 116, from being passed to designated applications 260. This allows applications 260 to be direct consumers of the IoT device 116 data, and the applications 260 may pass data to back-end services associated with the application 260 that are explicitly allowed to receive the data, per the firewall policy. This can also be used to identify compromised IoT devices 116, and for sand boxing insecure IoT devices 116 through the secure, IoT device broker 276, which may prevent the propagation of malware or hostile device behaviors to higher level applications and services via behavioral analytics and point-of-connect.

A data analytics agent 278 may execute in the user space 226 of the computer-readable memory 206, and may be configured to collect anonymized information and data that is received by the network hub 102 from the IoT device(s) 116, and report this anonymized information/data to the management system 122. The management system 122 may opt to perform big data analysis on this data in the cloud, and may resell the anonymized data to third party entities. As an illustrative example, an IoT device 116 may include a weather sensor that detects weather-related measurements, such as temperature, humidity, precipitation, and/or any other suitable weather-related data. The data analytics agent 278 may collect, anonymize, and report this data to the management system 122. In this manner, the management system 122 may receive this type of data from multiple network hubs 102, and, as a result, the management system 122 can analyze the anonymized data to determine and output information such as microclimates in particular geographic areas, which may not be ascertainable from larger scale weather systems that use satellites and similar tools to collect weather-related data at a lower level of granularity as compared to an IoT device 116 located in a particular environment 108. Thus, the management system 122 can aggregate crowd-sourced data and use it for various purposes, all while maintaining user 110 anonymity.

The processes described in this disclosure may be implemented by the architectures described herein, or by other architectures. These processes are illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. It is understood that the following processes may be implemented on other architectures as well.

Figure 3:
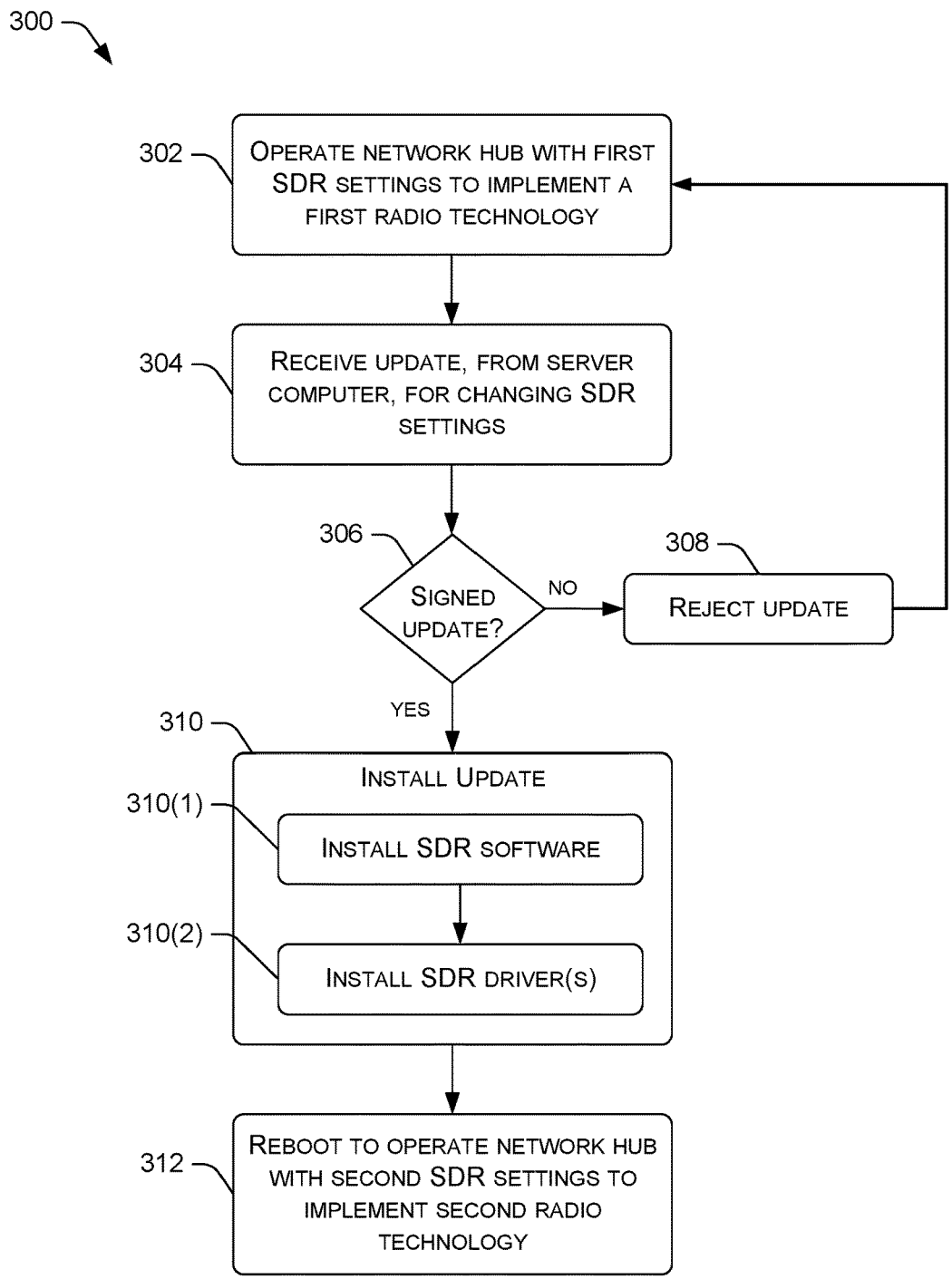
FIG. 3 illustrates a flowchart of an example process for reprogramming a fielded network hub in order to change the radio technology used by the network hub from a first radio technology to a second, different radio technology.

FIG. 3 illustrates a flowchart of an example process 300 for reprogramming a fielded network hub 102 in order to change the radio technology used by the network hub 102. The process 300 is described with reference to the previous figures, and may be implemented by a network hub 102 having a configurable SDR 208, in part while the network hub 102 is interacting with a remote management system 122.

At 302, a network hub 102 may operate with first settings for a configurable SDR 208 of the network hub 102. The first settings of the configurable SDR 208 may cause the network hub 102 to operate using a first radio technology. The first radio technology may be a cellular-based radio technology, meaning a radio technology used to transmit data over a cellular network (or mobile network), at least a last link of the cellular network being a wireless link. The telecommunications network 104 of FIG. 1 may represent such a cellular network. In some embodiments, the first radio technology implemented at block 302 may be based on a telephony-based protocol, such as the 4G LTE telephony-based protocol. In some embodiments, the first settings may cause the configurable SDR 208 to operate at a first center point frequency. It is also to be appreciated that, at block 302, the network hub 102 may be a fielded unit, meaning that the network hub 102 may have already been manufactured and obtained (e.g., purchased) by an end user at the time block 302 is performed. Said another way, the network hub 102 may operate "in the field" at block 302.

At 304, the configuration manager 274 of the network hub 102 may receive, from a server computer (e.g., a server computer of the management system 122) over a computer network (e.g., the telecommunications network 104 and/or one or more additional computer networks 124), an update (e.g., a software update, binary, etc.) to change the first settings of the configurable SDR 208 to second, different settings.

At 306, the configuration manager 274 of the network hub 102 may determine whether the update received at block 304 is associated with (e.g., signed by) a trusted entity. The trusted entity may be a carrier that provides IMS-based services to subscribing users, such as the user 110 of FIG. 1. The carrier, using the management system 122, may sign an update with a carrier-issued key that indicates the authenticity of the received update as having been provided by a trusted entity.

If, at block 306, the configuration manager 274 of the network hub 102 determines that the update is not associated with (e.g., signed by) the trusted entity (e.g., not signed with the proper carrier-issued key), the process 300 may follow the "no" route from block 306 to block 308 where the configuration manager 274 may reject the update, and revert to block 302, where the network hub 102 may continue operating with the first settings for the configurable SDR 208, which causes the network hub 102 to continue implementation of the first radio technology.

If, at block 306, the configuration manager 274 of the network hub 102 determines that the update is associated with (e.g., signed by) the trusted entity (e.g., signed with the proper carrier-issued key), the process 300 may follow the "yes" route from block 306 to block 310.

At 310, the configuration manager 274 of the network hub 102 may install the update on the network hub 102. As shown by block 310(1) of FIG. 3, installing the update on the network hub 102 may include installing SDR software 208(2) on the network hub 102. As mentioned, the SDR software 208(2) for the configurable SDR 208 is executed partially in the user space 226 of the network hub 102 and partially in the kernel space 228 of the network hub 102. Accordingly, the update may include kernel-pace software and/or user-space software for the configurable SDR 208. Additionally, or alternatively, as shown by block 310(2) of FIG. 3, installing the update on the network hub 102 may include installing one or more SDR drivers 208(3) on the network hub 102. As mentioned, the SDR drivers 208(3) may be loaded and/or executed by the OS kernel 230 of the network hub 102 at runtime. Thus, the update may include one or more binaries for one or more SDR drivers 208(3) for the configurable SDR 208. It is also to be appreciated that, at block 310, the update received at block 304 may be installed without changing any hardware of the network hub 102, such as the SDR hardware 208(1). This makes the network hub 102 field programmable (e.g., upgradeable) without requiring a re-design of the hardware platform for the network hub 102.

At 312, the network hub 102 may be rebooted with the updated, configurable SDR 208, which, after reboot, is configured with the second, different settings associated with the update installed at block 310. The second settings for the configurable SDR 208 cause the network hub 102 to operate using a second, different radio technology. The second, different radio technology may be a cellular-based radio technology and/or based on a telephony-based protocol, such as the 5G telephony-based protocol. In some embodiments, the second, different settings associated with the update installed at block 310 may cause the configurable SDR 208 to operate at a second center point frequency that is different from the first center point frequency associated with the first SDR settings at block 302.

The process 300 may be used to quickly and efficiently modify the radio technologies employed by the network hub 102 for any suitable purpose. For example, the field programmability of the network hub 102 may allow a device manufacturer and/or carrier associated with the network hub 102 to re-purpose the network hub 102 for compatibility with a new (or different) telephony standard. By contrast, existing technologies are unable to modify radio technologies as quickly and efficiently as the disclosed the network hub 102 can. This may be due, at least in part, to the fact that existing networked products are not field programmable, and, instead, must be completely redesigned from the hardware platform up in order to implement a different radio technology. This can cause a significant time lag between the time that a standard that defines a new radio technology is ratified and the time that compatible products actually hit the market, which could be as long as 18 to 24 months after the time the standard is ratified. However, the network hub 102 with the configurable SDR 208 described herein can be programmed (e.g., upgraded) in the field in a much faster time frame, and more efficiently, because a hardware redesign is not necessary to perform the process 300 with a field programmable network hub 102. A carrier, perhaps with assistance from a third party software vendor, can build a new SDR software 208(2) stack and/or create a new SDR driver(s) 208(3) (e.g., a new binary), and push the update to the network hub 102 in order to change the radio technology employed by the network hub 102.

It is to be appreciated that a "fielded unit," as used herein, may not only include devices that have been obtained (e.g., purchased) by end users, but also may include devices that have been manufactured, but not yet obtained (e.g., purchased) by end users. For example, the process 300 may be utilized to update surplus network hubs 102 that are sitting in a warehouse and were programmed with first SDR software 208(2) and SDR drivers 208(3) to enable the first settings when the network hubs 102 are operated at block 302. These surplus products do not have to be discarded or re-manufactured if the techniques and systems described herein are utilized. That is, an update can be pushed to the surplus network hubs 102 using the process 300 to render the surplus network hubs 102 compatible with a new radio technology, all without changing the underlying hardware platforms of the network hubs 102.

It is also to be appreciated that, although cellular-based radio technologies and telephony-based protocols are provided as example radio technologies herein, the process 300 can be implemented for any suitable radio technology other than cellular and/or telephony-based protocols.

Figure 4:
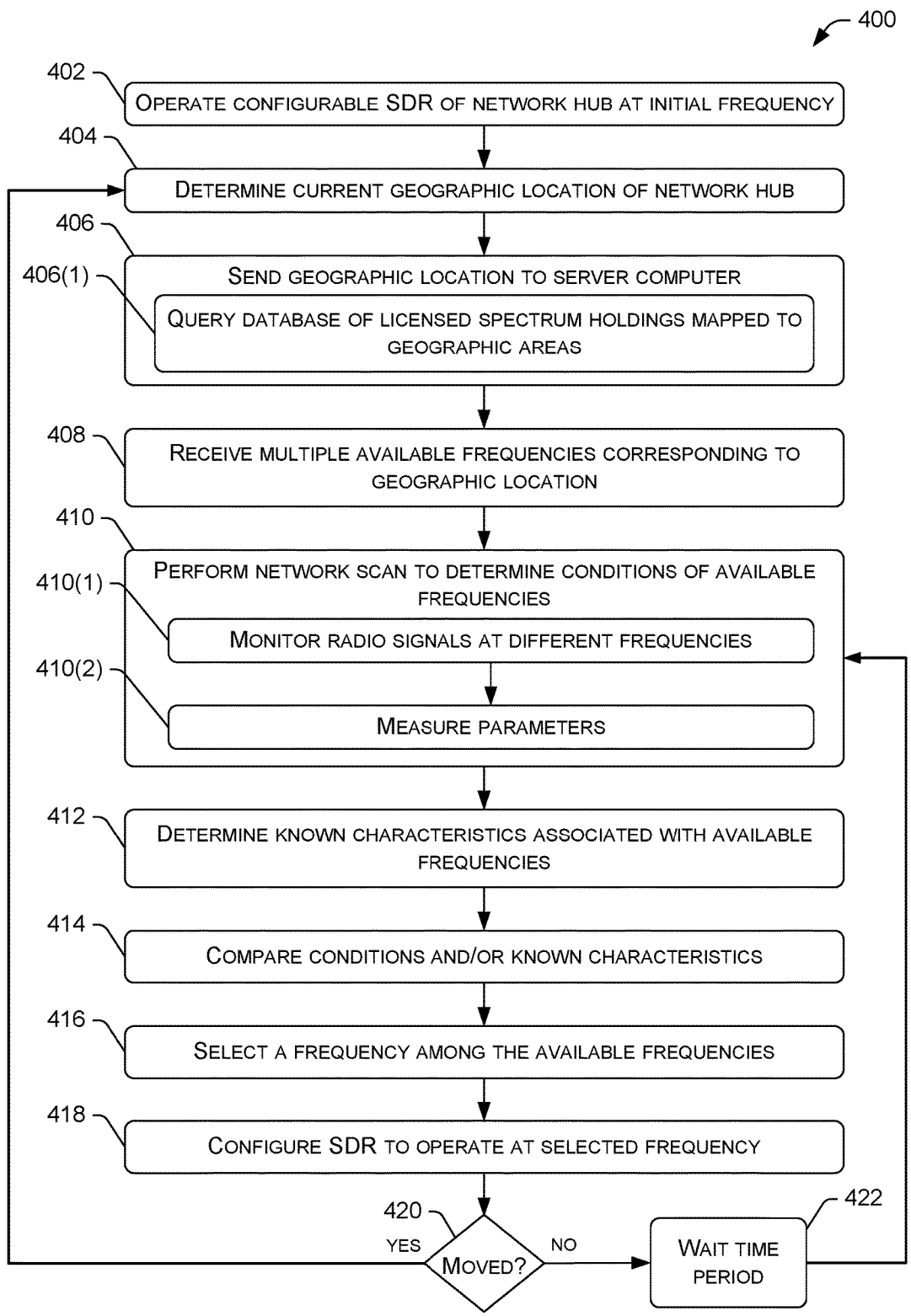
FIG. 4 illustrates a flowchart of an example process for dynamically selecting a desired frequency, among available licensed spectrum holdings of a carrier, and operating a network hub at the selected frequency.

FIG. 4 illustrates a flowchart of an example process 400 for dynamically selecting a frequency, among available licensed spectrum holdings of a carrier, and operating a network hub 102 at the selected frequency. The process 400 is described with reference to the previous figures, and may be implemented by a network hub 102 at runtime, in part while the network hub 102 is interacting with a remote management system 122.

At 402, the configurable SDR 208 of the network hub 102 may operate at an initial frequency. The initial frequency may comprise a center point frequency of the configurable SDR 208, as described herein.

At 404, the network hub 102 may determine, using a location determination module (e.g., a GPS receiver 222) of the network hub 102, a current geographic location of the network hub 102. The determined geographic location may be expressed in any suitable manner, as described herein, such as a latitude, longitude pair.

At 406, the network hub 102 may send, over a computer network (e.g., the telecommunications network 104 and/or one or more additional networks 124), the current geographic location of the network hub 102 to a server computer (e.g., a server computer of the management system 122). In some embodiments, as shown by block 406(1) in FIG. 4, the management system 122 may maintain, or otherwise have access to, a database containing mappings between geographic areas and licensed spectrum holdings of a carrier associated with the network hub 102. For example, the database may specify geographic regions or areas (e.g., defined by latitude, longitude coordinates) that can be queried, each geographic region being mapped to one or more available frequencies that have been allocated to a carrier of IMS-based services (e.g., telephony services) for the geographic region. These available frequencies in the database may correspond to licensed spectrum holdings of the carrier. The database query can be performed at block 406(1) by the management system 122 on behalf of the network hub 102 that may send an instruction to the management system 122, or by the network hub 102 querying the remote database that contains mappings between geographic areas and licensed spectrum holdings of the carrier.

At 408, the network hub 102 may receive, from the server computer over the computer network, multiple available frequencies at which the configurable SDR 208 of the network hub 102 can be configured to operate. For example, A response to the query submitted at block 406(1) may include, for a given geographic location included in the query, the multiple available frequencies around (e.g., within a threshold distance from, within a designated geographic area that contains, etc.) the given geographic location. For example, the multiple available frequencies returned for a query may include 600 MHz, 620 MHz, 1900 MHz, 700 MHz, and 3.5 GHz frequencies.

At 410, the network hub 102 may perform a network scan to determine respective current conditions of individual frequencies of the multiple available frequencies. As shown by blocks 410(1) and 410(2) of FIG. 4, the network scan may include monitoring respective radio signals at the individual frequencies, and measuring parameters associated with the respective, monitored radio signals. For example, a first radio signal at the first available frequency of 600 MHz may be monitored at block 410(1), and a first parameter for that first radio signal may be measured at block 410(2). A second radio signal at the second available frequency of 620 MHz may be monitored at block 410(1), and a second parameter for the second radio signal may be measured at block 410(2). This may iterate at block 410 for any given number of available frequencies received at block 408. The current conditions determined from the network scan at block 410 may relate to any suitable type of measurable radio signal condition, such as a level of congestion associated with the individual frequency, a radio signal strength associated with the individual frequency, an amount of interference associated with the individual frequency, or any other suitable condition that can be determined from the measured parameters.

At 412, the network hub 102 may determine respective known characteristics of the individual frequencies received at block 408. For example, a known characteristic may relate to an ability of an individual frequency to penetrate one or more materials (e.g., cement walls of a structure, such as a building). These known characteristics may be obtained from testing radio systems in experimental settings at different frequencies to understand the characteristics (e.g., material penetration or density) of radio signals transmitted at different frequencies. These characteristics may be mapped to individual frequencies and maintained in a database, either locally at the network hub 102, or in a remote database available to the network hub 102 and/or the management system 122.

At 414, the configuration manager 274 of the network hub 102 may compare the current conditions determined at block 410 and/or the known characteristics determined at block 412 between pairs of available frequencies, which allows the configuration manager 274 to determine which frequency might be preferable over (e.g., better than) others in the set of available frequencies received at block 408. For example, a level of congestion for the first available frequency of 600 MHz may be determined to be greater than or less than a level of congestion for the second available frequency of 620 MHz, as determined from the comparison of the current conditions at block 414. As another example, the material penetration ability of the first available frequency of 600 MHz may be determined to be greater than or less than the material penetration ability of the second available frequency of 620 MHz, as determined from the comparison of the known characteristics at block 414. Current conditions and/or known characteristics associated with pairs of available frequencies may be compared in a similar manner for any pair of available frequencies in this manner to determine a frequency with optimal conditions and/or characteristics that may be preferable over the other available frequencies. In some embodiments, the comparison at block 414 may further include scoring and ranking the available frequencies based on the comparison between the conditions and/or known characteristics associated with those frequencies. For example, the configuration manager 274 may assign a score to each frequency based on a function of the conditions and/or known characteristics for each frequency.

At 416, the configuration manager 274 of the network hub 102 may select one of the available frequencies based at least in part on the comparison at block 414. For example a frequency with the best current conditions (e.g., lowest congestion, highest radio signal strength, lowest interference, etc.) and/or the best characteristics (e.g., greatest material penetration ability, etc.) may be selected among the available frequencies. In the running example, the selected frequency might be the first available frequency of 600 MHz, if the current conditions and/or known characteristics of this frequency are preferable over other available frequencies. For example, other available frequencies may be more congested, experiencing noise and/or interference from a nearby macro cell base station, while the first available frequency may not have these adverse conditions and/or characteristics, or may have them at reduced levels that are preferable over higher levels. In some embodiments, selecting a frequency at block 416 may include selecting a highest scoring frequency, if scoring and ranking is implemented at block 414.

At 418, the configuration manager 274 of the network hub 102 may configure the configurable SDR 208 of the network hub 102 to operate at the selected frequency. The selected frequency may comprise a center point frequency of the configurable SDR 208, as described herein, which may be different from the initial frequency at which the configurable SDR 208 may have operated in block 402.

At 420, the location determination module (e.g., GPS receiver 222) of the network hub 102 may determine whether the network hub 102 has moved to a different geographic location from the previous geographic location determined at block 404. If movement of the network hub 102 is detected at block 420, the process 400 may follow the "yes" route from block 420 back to block 404 where the process 400 is repeated with respect to the new, different geographic location. Thus, movement of the network hub 102 may trigger a new dynamic selection of an optimal frequency at which to operate the configurable SDR 208.

Passage of time may be another trigger to repeat at least a portion of the process 400. For example, in the case where the location determination module (e.g., GPS receiver 222) of the network hub 102 determines that the network hub 102 has not moved since a previous frequency selection, and after a period of time, as shown at block 422, the network hub 102 may perform a subsequent network scan at block 410 to determine new current conditions associated with the available frequencies. If any of the conditions have changed, the configuration manager 274 may determine at block 414 that a different frequency is preferable over a previously-selected frequency, and may select this different frequency at which to operate the configurable SDR 208 for improved QoS. A new, different frequency may be selected at block 416 in a scenario where licensed spectrum holdings of the carrier have changed since the current frequency was selected in a previous iteration of the process 400.

The process 400 may be carried out by the network hub 102 at multiple different times in order to iteratively select a best frequency at which to operate for improving QoS of radio signals received by, and transmitted from, the network hub 102. Again, this can be done without changing the hardware platform of the network hub 102 due to the flexibility provided by the configurable SDR 208.

The network hub 102 may utilize trusted execution technologies such that firmware is verified prior to boot to ensure the network hub 102 and firmware has not been tampered with. In an effort to enable developers to build new technologies on the network hub's 102 platform, a tiered unlock approach may be utilized to allow a specific network hub 102 to be unlocked at a requested level of access by a requesting user that is permitted the requested level of access. Unlocked network hubs 102 may be referred to as "development devices." Development devices allow a developer to build applications 260 without the requirement to sign the application 260, yet certain functionality of the network hub 102 may remain hidden or protected from the developer (e.g., settings of the configurable SDR 208). In some embodiments, a high level of access may be granted to a developer via a corresponding certificate so that the developer can access a development environment of the network hub 102 at the requested level. This may allow the developer to access secure areas and functionality of the network hub 102, such as the configurable SDR 208. Meanwhile, lower levels of access may be granted to other users that do not have permission to access these types of secure areas and functionality.

Figure 5:
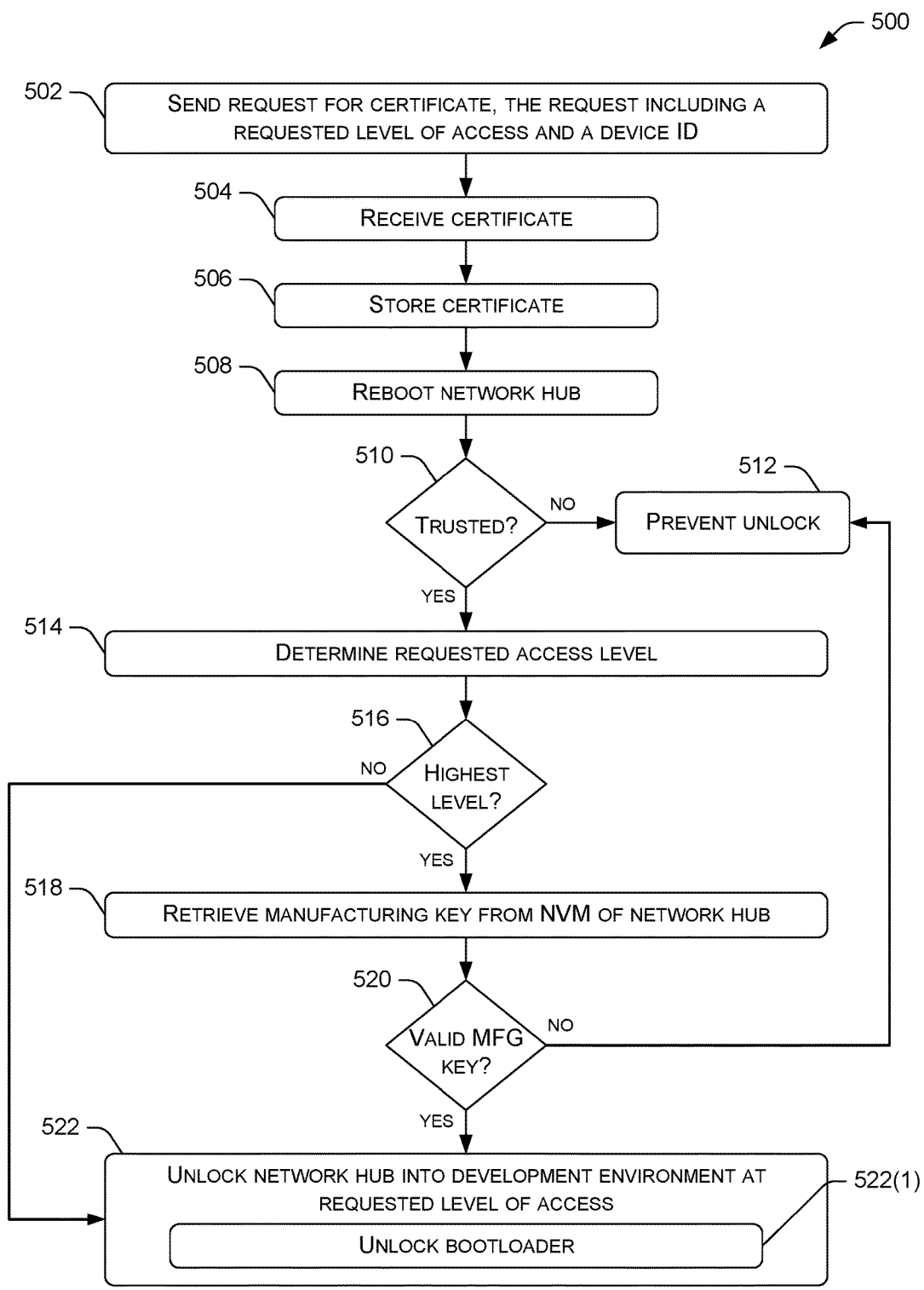
FIG. 5 illustrates a flowchart of an example process for unlocking a network hub into a development environment at a requested level of access.

FIG. 5 illustrates a flowchart of an example process 500 for unlocking a network hub 102 into a development environment at a requested level of access. The process 500 is described with reference to the previous figures, and may be implemented by a network hub 102, in part while the network hub 102 is interacting with a remote management system 122.

At 502, the network hub 102 may send, over a computer network to a server computer (e.g., a server computer of the management system 122), a request for a certificate that is usable to unlock the network hub 102 into a development environment. The request that is sent at block 502 may include (i) a requested level of access, and (ii) a device identifier (ID) associated with the network hub 102. The device ID may include any type of ID that uniquely identifies the network hub 102, such as an International Mobile Equipment Identity (IMEI) associated with the network hub 102. An IMEI may be physically printed somewhere on the network hub 102 and/or the IMEI may be stored electronically in non-volatile memory of the network hub 102. In some embodiments, the request at block 502 may be sent by the network hub 102 in response to user input received at the network hub 102, or in response to user input received at a device in communication with the network hub 102, such as the mobile device 112.

At 504, the network hub 102 may receive the certificate from the server computer (e.g., the server computer of the management system 122) over the computer network. The certificate received at 504 may be device-specific such that the certificate is unique to the network hub 102 and can be used exclusively to unlock the network hub 102 into a development environment. For example, the certificate may not be usable to unlock any other device besides the network hub 102, including other network hubs. Thus, if the user 110 were to try and unlock another network hub with the received certificate, the other network hub would not be unlockable with the certificate because the certificate is specific to a single network hub 102; in this case, the requesting network hub 102. The certificate may also be associated with the requested level of access. If the request is not approved by the management system 122, such as when the user is not authorized to unlock the network hub 102 at the requested level of access, the request may be denied in response to sending the request for the certificate at block 502. FIG. 5 illustrates a scenario where the request is approved, and the certificate is, therefore, received at block 504.

At 506, the network hub 102 may store the certificate in non-volatile memory of the network hub 102, such as in the flash memory 246. Thus, the certificate may be retrievable after reboot of the network hub 102.

At 508, the network hub 102 may be rebooted. This may cause the bootloader 238 to load, which may cause the trusted boot component 240 to load and being execution, where the loading of the bootloader 238 and the trusted boot component 240 may occur before the network hub 102 is unlocked into a development environment.

At 510, the trusted boot component 240 may determine whether the certificate is associated with a trusted entity. This may involve retrieving the certificate from non-volatile memory of the network hub 102, and determining whether the certificate is signed with a key issued by the trusted entity. The trusted entity may be a carrier associated with the network hub 102, and the carrier may provide IMS-based services to subscribing users via associated devices. The key issued by the trusted entity may be a hash. The key issued by the trusted entity may also be assigned to, or otherwise associated with, the particular network hub 102, such as by associating the key issued by the trusted entity with the device ID (e.g., the IMEI) associated with the network hub 102.

If, at block 510, the trusted boot component 240 determines that the certificate is not associated with the trusted entity, the process 500 may follow the "no" route from block 510 to block 512, where the trusted boot component 240 prevents the network hub 102 from being unlocked into the development environment. This may involve refraining from unlocking the bootloader 238 of the network hub 102. If, at block 510, the trusted boot component 240 determines that the certificate is associated with the trusted entity, the process 500 may follow the "yes" route from block 510 to block 514.

At 514, the trusted boot component 240 may determine the requested level of access associated with the certificate. There can be multiple levels of unlock using the tiered unlock approach described herein. A first level of access, which may correspond to a highest level of access among the multiple levels, may allow a user (developer) to unlock firmware and/or run unsigned firmware on the network hub 102. This first level may, additionally or alternatively, allow a user to change settings of the configurable SDR 208 of the network hub 102. A second level of access, which may be a lower level of access than the first level of access, may allow a user (developer) to unlock applications 260 and/or run unsigned applications 260, user controlled application containers 256, and/or VMs within the network hub 102. The second level of access, although allowing a user to load custom software (e.g., applications 260) on the network hub 102, may prevent the user from accessing one or more secure areas and/or altering secure functionality of the network hub 102, such as by preventing the user from changing the settings of the configurable SDR 208. This secure area/functionality protection may be enabled by the user controlled containers 256 executing in the user space 226 of the network hub 102. For example, the requested level of access may allow the user to access the development environment of the network hub 102 at a level of access that corresponds to the user controlled containers 256, which prevents the user from accessing secure areas and/or functionality external to the user controlled containers 256, which may include the configurable SDR 208 settings.

At 516, if it is determined that the requested level of access is a first (e.g., highest level) of access, the process 500 may follow the "yes" route from block 516 to block 518.

At 518, the trusted boot component 240 may retrieve a manufacturing key from non-volatile memory (NVM) of the network hub 102, such as from the flash memory 246. This manufacturing key may be permanently persisted (sometimes referred to as "burned" or "baked") in the hardware platform. Said another way, the manufacturing key may be unable to be erased or deleted from the hardware platform. The manufacturing key may also be device-specific and persisted in non-volatile memory at a time of manufacturing or assembly of the network hub 102.

At 520, the trusted boot component 240 may validate the manufacturing key. Validation of the manufacturing key at 520 may occur in various ways, such as by comparing hashes, determining whether the manufacturing key is signed by a trusted entity, such as the trusted entity that signed the certificate, and so on. In the event that the manufacturing key is determined to be invalid at block 520, the process 500 may follow the "no" route from block 520 to block 512 where the unlocking of the network hub 102 is prevented or disabled.

At 522, in response to determining that the certificate is associated with the trusted entity at block 510, the network hub 102 may be unlocked into the development environment at the requested level of access as an unlocked network hub. This may occur in response to validating the manufacturing key at block 520 if the requested level of access is a first, highest level of access, or without retrieval of the manufacturing key if the requested level of access is determined to be a second, lower level of access at block 516. This latter scenario is shown by the process 500 following the "no" route from block 516 to block 522 without performing blocks 518 and 520. As shown by block 522(1) of FIG. 5, in some embodiments, unlocking the network hub 102 into the development environment comprises unlocking a bootloader 238 of the network hub 102.

As mentioned, depending on the level of access that is requested and granted in the context of the process 500, the unlocked network hub 102 resulting from block 522 may or may not allow a user to change settings of the configurable SDR 208 of the network hub 102. For example, when the requested level of access is determined, at block 514, to be a first, highest level of access, the unlocked network hub 102 may allow the user to change settings of the configurable SDR 208, whereas, when the requested level of access is determined, at block 514, to be a second, lower level of access, the unlocked network hub 102 may allow the user to load custom software on the network hub 102 (e.g., to load unsigned applications 260 within the user controlled containers 256), yet prevent the user from changing the settings of the configurable SDR 208. In some embodiments, the first, highest level of access may unlock the overall platform of the network hub 102, turning the network hub 102 into a developer device where the user has access to the base layer of the hardware. A user with this first, highest level of access may be able to write a new OS for the device, and/or write a new software stack for the configurable SDR software 208(2) and/or SDR driver(s) 208(3) to implement a new radio technology. Although two levels of access are described by way of example, the tiered developer unlock approach can be implemented with any number of access levels or tiers to provide varying levels of access to a development environment of the network hub 102.

Figure 6:
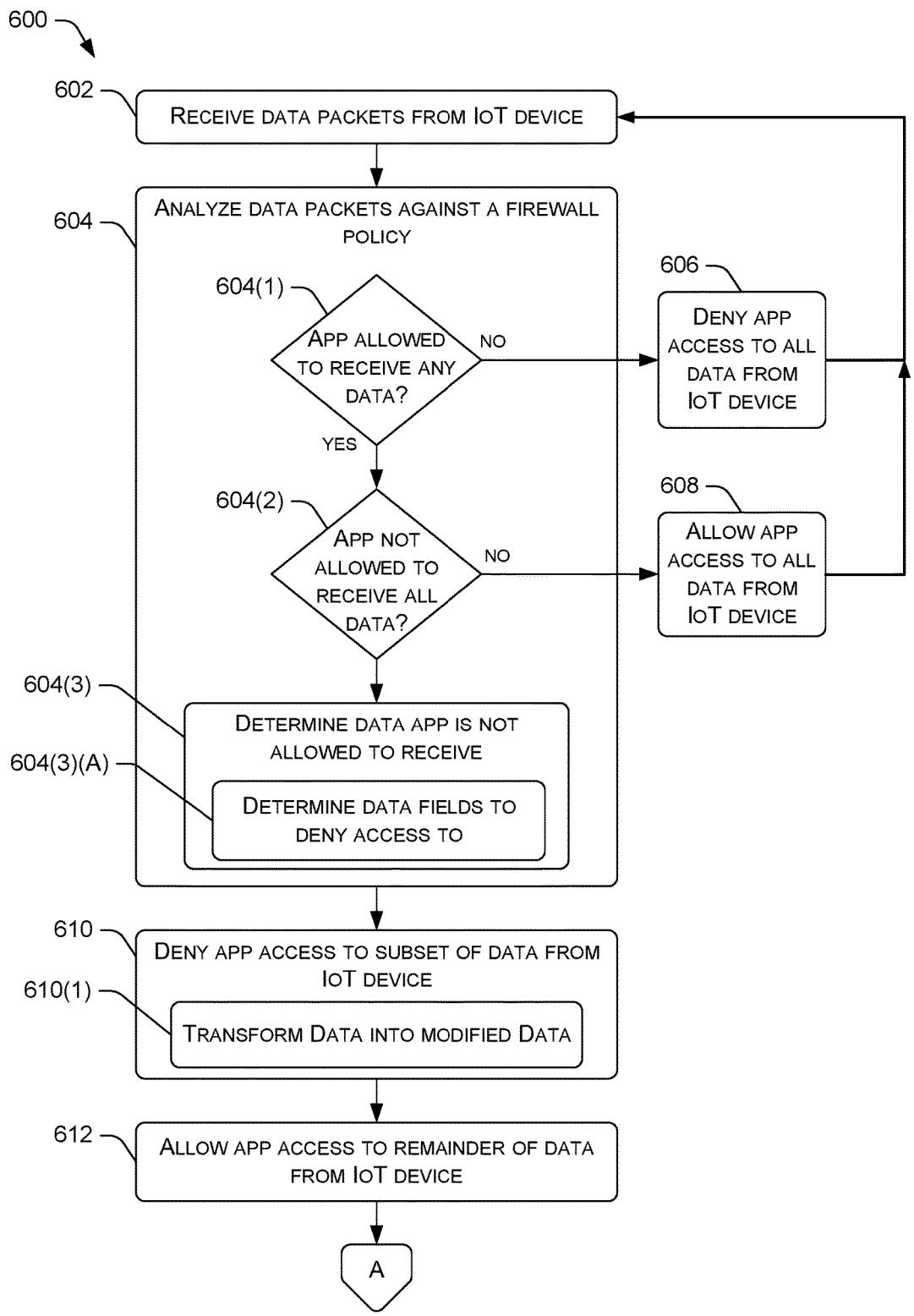
FIG. 6 illustrates a flowchart of an example process for implementing an IoT firewall policy by a network hub.

FIG. 6 illustrates a flowchart of an example process 600 for implementing an IoT firewall policy by a network hub 102. The process 600 is described with reference to the previous figures, and may be implemented by a network hub 102, in part while the network hub 102 is interacting with one or more IoT devices 116.

At 602, an Internet of Things (IoT) device broker 276 of a network hub 102 may receive data packets from an IoT device 116 that is communicatively coupled to the network hub 102. As described herein, the IoT device 116 can comprise any suitable type of object (e.g., a sensor) with an addressable interface. The IoT device 116 may be located in a common environment 108 with the network hub 102, and, as such, the IoT device 116 may be within a threshold distance from the network hub 102 to say that the IoT device 116 is in the vicinity of the network hub 102 (e.g., within 50 feet of the network hub 102). The environment 108 may include a dwelling or a similar structure, and the IoT device 116 may be situated in or on the dwelling.

At 604, the IoT device broker 276 may analyze the data packets against a firewall policy stored in memory 206 of the network hub 102. The firewall policy may indicate particular ones of the applications 260 that are to be denied access to data packets received from the particular IoT device 116. Accordingly, at block 604(1), the IoT device broker 276 may determine whether an application 260 executing on the network hub 102 is allowed to receive any data from the IoT device 116 that sent the data packets. If the application 260 is not allowed to receive any data from the particular IoT device 116, the process 600 may follow the "no" route from block 604(1) to block 606 where the application 260 is denied access to the data within the data packets that were received from the IoT device 116. The process 600 may iterate after block 606 back to block 602 until additional data packets are received.

If, at block 604(1), the IoT device broker 276 determines, pursuant to the firewall policy, that the application 260 is allowed to receive at least a portion of the data within the data packets from the particular IoT device 116, the process 600 may follow the "yes" route from block 604(1) to block 604(2), where the IoT device broker 276 may determine whether the application 260 is not allowed to receive all of the data from the particular IoT device 116. If, at block 604(2), it is determined that the application 260 is allowed to receive all of the data from the IoT device 116, the process 600 may follow the "no" route from block 604(2) to block 608 where the application 260 is allowed access to all of the data within the data packets that were received from the IoT device 116, with no restrictions. Again, the process 600 may iterate after block 608 back to block 602 until additional data packets are received.

If, at block 604(2), the IoT device broker 276 determines, pursuant to the firewall policy, that the application 260 is not allowed to receive all of the data (but is allowed to receive a portion of the data) from the IoT device 116, the process 600 may follow the "yes" route from block 604(2) to block 604(3), where the analysis continues by determining the subset of data that the application 260 is not allowed to receive. As shown by block 604(3)(A), the data within the data packets may be organized into a plurality of data fields (e.g., 10 data fields). Each field may contain a different type of data from the IoT device 116. Accordingly, at 604(3)(A), the determination of the subset of data that the application 260 is not allowed to receive may include determining a subset of a plurality of data fields to which the application is not allowed access (e.g., data fields 1-5 out of 10 available data fields).

At 610, the IoT device broker 276 may deny the application 260 access to the subset of the data within the data packets determined at block 604(3), which is based on the firewall policy. Continuing with the running example, the IoT device broker 276 may deny the application 260 access to data fields 1-5 out of 10 available data fields, if the firewall policy specifies the application 260 as not having access to data fields 1-5 from data received from the particular IoT device 116. As shown by block 610(1) of FIG. 6, denying the application 260 access to the subset of data may include transforming the data into modified data. Transforming the data at block 610(1) may include, without limitation, masking the subset of data (e.g., by obscuring the subset of data to render it unreadable by the application 260), deleting the subset of data, or replacing the subset of data with generic data.

At 612, the IoT device broker 276 may allow the application 260 access to a remainder of the data within the data packets received from the IoT device 116, based at least in part on the firewall policy. This may involve providing the modified data resulting from block 610(1) to the application 260, where the modified data may include the remainder of the data that the application 260 is allowed to access.

It is to be appreciated that steps 604-612 can iterate for additional applications 260 to determine which applications 260 are allowed to access/receive data received from a particular IoT device 116. Also, as additional data packets are received from the same IoT device 116 and/or different IoT devices 116, the process 600 may be performed with respect to those additional data packets to continuously govern the applications' 260 access to IoT device data. The result is that particular ones of the applications 260 end up receiving particular IoT device data from particular IoT devices 116, pursuant to the firewall policy so that some IoT device data can be shared with designated applications 260 and not with others.

Figure 7:
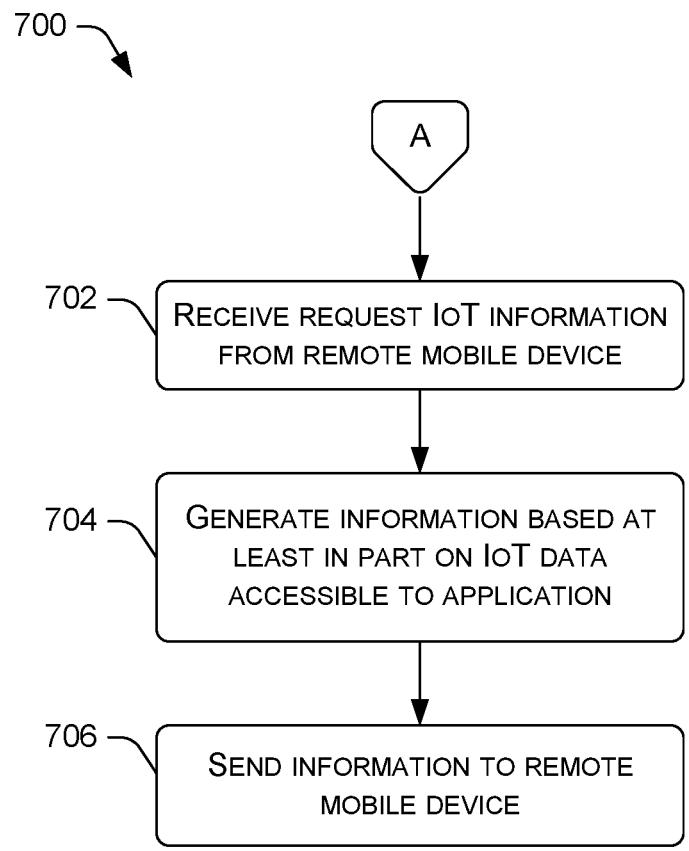
FIG. 7 illustrates a flowchart of an example process for providing zero-configuration remote access to IoT services.

FIG. 7 illustrates a flowchart of an example process 700 for providing zero-configuration remote access to IoT services. The process 700 is described with reference to the previous figures, and may be implemented by a network hub 102 acting as a zero-configuration IoT gateway device. The process 700 may continue from block 612 of the process 600 of FIG. 6, as shown by the off-page reference "A" in FIGS. 6 and 7.

At 702, a VPN client 270 of a network hub 102 may receive, from a mobile device 112, a request for information. The information requested at block 702 may be IoT device 116 information that is generated by an application 260 with access to the IoT device 116 data. In some embodiments, the request may be associated with a particular application 260 executing on the network hub 102.

At 704, the application 260 with access to the relevant IoT device data may generate the requested information based at least in part on the data from the IoT device 116 that the application 260 has access to. This may be the data that is allowed at block 612 of the process 600.

At 706, the VPN client 270 of the network hub 102 may send the information over a computer network to the remote mobile device 112. The process 700 allows a user 110 to tunnel into an environment 108 where a network hub 102 is located along with other connected devices, such as the IoT devices 116 described herein, and to obtain information regarding those connected devices, and/or to control the devices, and/or change settings of those devices.

The environment and individual elements described herein may of course include many other logical, programmatic, and physical components, of which those shown in the accompanying figures are merely examples that are related to the discussion herein.

The various techniques described herein are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

I claim:

1. A network hub comprising:
a configurable software defined radio (SDR);
one or more processors; and
memory storing instructions that, when executed by the one or more processors, cause the network hub to:
send, over a computer network to a server computer, a request for a certificate that is usable to unlock the network hub into a development environment, the request including (i) a requested level of access, and (ii) a device identifier (ID) associated with the network hub;
receive, from the server computer over the computer network, the certificate;
reboot the network hub;
determine whether the requested level of access associated with the certificate is a first level of access, or a second level of access;
determine whether the certificate is associated with a trusted entity; and
in response to determining that the certificate is associated with the trusted entity, unlock the network hub into the development environment at the requested level of access as an unlocked network hub, wherein the unlocked network hub:
allows a user to change settings of the configurable SDR when the requested level of access is the first level of access, or
allows the user to load custom software on the network hub, yet prevents the user from changing the settings of the configurable SDR when the requested level of access is the second level of access.

2. The network hub of claim 1, wherein:
the instructions, when executed by the one or more processors, further cause the network hub to store the certificate in non-volatile memory of the network hub prior to rebooting the network hub; and
determining whether the certificate is associated with the trusted entity comprises determining whether the certificate is signed with a key issued by the trusted entity.

3. The network hub of claim 1, further comprising a bootloader, wherein unlocking the network hub into the development environment comprises unlocking the bootloader of the network hub.

4. The network hub of claim 1, further comprising a manufacturing key persisted in non-volatile memory of the network hub, wherein:
the requested level of access is determined to be the first level access;
the instructions, when executed by the one or more processors, further cause the network hub to, after rebooting the network hub:
retrieve the manufacturing key from the non-volatile memory, and
validate the manufacturing key; and
unlocking the network hub is further conditioned on validating the manufacturing key.

5. The network hub of claim 1, wherein the device ID comprises an International Mobile Equipment Identity (IMEI) associated with the network hub.

6. The network hub of claim 1, wherein the settings of the configurable SDR are changeable to provide the network hub with different cellular-based radio technologies.

7. The network hub of claim 1, wherein the trusted entity is a carrier that provides Internet Protocol Multimedia Subsystem (IMS)-based services to subscribing users via associated devices.

8. A computer-implemented method implemented by a network hub, the method comprising:
sending, over a computer network to a server computer, a request for a certificate that is usable to unlock the network hub into a development environment, the request including (i) a requested level of access, and (ii) a device identifier (ID) associated with the network hub;
receiving the certificate from the server computer over the computer network;
rebooting the network hub;
determining whether the certificate is associated with a trusted entity; and
in response to determining that the certificate is associated with the trusted entity, unlocking the network hub into the development environment at the requested level of access as an unlocked network hub, wherein the unlocked network hub:
allows a user to change settings of a configurable software defined radio (SDR) of the network hub when the requested level of access is a first level of access, or
allows the user to load custom software on the network hub, yet prevents the user from changing the settings of the configurable SDR when the requested level of access is a second level of access.

9. The computer-implemented method of claim 8, further comprising, prior to rebooting the network hub, storing the certificate in non-volatile memory of the network hub, wherein the determining whether the certificate is associated with the trusted entity comprises determining whether the certificate is signed with a key issued by the trusted entity.

10. The computer-implemented method of claim 8, wherein the certificate is usable to unlock the network hub into the development environment at the requested level of access, and wherein the certificate is not usable to unlock any other device besides the network hub.

11. The computer-implemented method of claim 8, wherein the requested level of access is determined to be the first level of access, the method further comprising, after the rebooting of the network hub:
retrieving a manufacturing key from non-volatile memory of the network hub; and
validating the manufacturing key,
wherein the unlocking of the network hub into the development environment is further conditioned on validating the manufacturing key.

12. The computer-implemented method of claim 8, wherein the device ID comprises an International Mobile Equipment Identity (IMEI) associated with the network hub.

13. The computer-implemented method of claim 8, wherein the unlocking of the network hub into the development environment comprises unlocking a bootloader of the network hub.

14. One or more non-transitory computer-readable media storing computer-executable instructions that, when executed, cause one or more processors of a network hub to perform acts comprising:
sending, over a computer network to a server computer, a request for a certificate that is usable to unlock the network hub into a development environment, the request including (i) a requested level of access, and (ii) a device identifier (ID) associated with the network hub;
receiving the certificate from the server computer over the computer network;
rebooting the network hub;
determining whether the requested level of access associated with the certificate is a first level of access, or a second level of access;
determining whether the certificate is associated with a trusted entity; and
in response to determining that the certificate is associated with the trusted entity, unlocking the network hub into the development environment at the requested level of access as an unlocked network hub, wherein the unlocked network hub:
allows a user to change settings of a configurable software defined radio (SDR) of the network hub when the requested level of access is the first level of access, or
allows the user to load custom software on the network hub, yet prevents the user from changing the settings of the configurable SDR when the requested level of access is the second level of access.

15. The one or more non-transitory computer-readable media of claim 14, the acts further comprising, prior to the rebooting of the network hub, storing the certificate in non-volatile memory of the network hub, wherein the determining whether the certificate is associated with the trusted entity comprises determining whether the certificate is signed with a key issued by the trusted entity.

16. The one or more non-transitory computer-readable media of claim 14, wherein the certificate is usable to unlock the network hub into the development environment at the requested level of access, and wherein the certificate is not usable to unlock any other device besides the network hub.

17. The one or more non-transitory computer-readable media of claim 14, wherein the requested level of access is determined to be the first level of access, the acts further comprising, after the rebooting of the network hub:
retrieving a manufacturing key from non-volatile memory of the network hub; and
validating the manufacturing key,
wherein the unlocking the network hub into the development environment is further conditioned on validating the manufacturing key.

18. The one or more non-transitory computer-readable media of claim 14, wherein the device ID comprises an International Mobile Equipment Identity (IMEI) associated with the network hub.

19. The one or more non-transitory computer-readable media of claim 14, wherein the settings of the configurable SDR are changeable to provide the network hub with different cellular-based radio technologies.

20. The one or more non-transitory computer-readable media of claim 14, wherein:
the requested level of access is determined to be the second level of access; and
the unlocked network hub prevents the user from changing the settings of the configurable SDR by virtue of a container executing in user space of the network hub in which the custom software can be loaded.

* * * * *